US010502353B2

(12) United States Patent
Schumacher et al.

(10) Patent No.: US 10,502,353 B2
(45) Date of Patent: Dec. 10, 2019

(54) QUICK CONNECT RELEASE SYSTEM FOR A FLUID COUPLING

(71) Applicant: Kohler Co., Kohler, WI (US)

(72) Inventors: Jeffrey A. Schumacher, Port Washington, WI (US); Ravi Kumar Rajendran, Sheboygan, WI (US); John C. Redding, Oostburg, WI (US)

(73) Assignee: KOHLER CO., Kohler, WI (US)

( * ) Notice: Subject to any disclaimer, the term of this patent is extended or adjusted under 35 U.S.C. 154(b) by 452 days.

(21) Appl. No.: 15/167,325

(22) Filed: May 27, 2016

(65) Prior Publication Data

US 2017/0343143 A1 Nov. 30, 2017

(51) Int. Cl.
  *F16L 37/127* (2006.01)
  *F16L 37/098* (2006.01)
  *F16L 41/02* (2006.01)
  *F16L 33/207* (2006.01)

(52) U.S. Cl.
  CPC ......... *F16L 37/127* (2013.01); *F16L 37/0987* (2013.01); *F16L 41/023* (2013.01); *F16L 33/2071* (2013.01)

(58) Field of Classification Search
  CPC ..... F16L 21/06; F16L 37/127; F16L 33/2071; F16L 41/023
  USPC ........................................ 285/419, 373, 131
  See application file for complete search history.

(56) References Cited

U.S. PATENT DOCUMENTS

| 659,071 | A | 10/1900 | Joseph et al. |
| 929,067 | A | 7/1909 | Williamson |
| 2,908,744 | A * | 10/1959 | Bollmeier ............ H02G 15/113 174/76 |
| 4,452,097 | A * | 6/1984 | Sunkel .................. E05F 11/405 74/502.4 |
| 4,753,458 | A | 6/1988 | Case |
| 4,834,423 | A | 5/1989 | DeLand |
| 4,844,512 | A | 7/1989 | Gahwiler |
| 5,015,013 | A * | 5/1991 | Nadin ................. F16L 25/0045 285/419 |
| 5,104,158 | A | 4/1992 | Meyer et al. |
| 5,277,459 | A * | 1/1994 | Braun ...................... H02G 3/06 174/92 |

(Continued)

FOREIGN PATENT DOCUMENTS

| CA | 2707779 | 12/2011 |
| CN | 101699122 A | 4/2010 |

(Continued)

OTHER PUBLICATIONS

Chinese Office Action issued in corresponding application No. 201510292052 dated Mar. 1, 2017.

*Primary Examiner* — Aaron M Dunwoody
(74) *Attorney, Agent, or Firm* — Foley & Lardner LLP

(57) ABSTRACT

A quick connect and quick disconnect adaptor for a fluid coupling system is provided. The adaptor includes a first half having a center point, and a sidewall at least partially defining a plurality of bores. Each of the bores contains an aperture, and each of the bores terminates at the center point. The first half further includes a plurality of release tabs. Each release tab is configured to resiliently deflect through an aperture, and each release tab terminates at the center point. The adaptor further includes a second half, which is at least partially symmetric to the first half.

20 Claims, 23 Drawing Sheets

(56) References Cited

U.S. PATENT DOCUMENTS

| | | |
|---|---|---|
| 5,568,946 A | 10/1996 | Jackowski |
| 5,630,628 A | 5/1997 | Mönch |
| 5,799,986 A | 9/1998 | Corbett et al. |
| 5,992,902 A | 11/1999 | Knapp |
| 6,231,089 B1 | 5/2001 | DeCler et al. |
| 6,471,252 B1 | 10/2002 | Moretti et al. |
| 6,543,814 B2 | 4/2003 | Bartholomew |
| 6,679,528 B1 | 1/2004 | Poder |
| 6,684,906 B2 | 2/2004 | Burns et al. |
| 6,692,038 B2 | 2/2004 | Braun |
| 7,810,848 B2 | 10/2010 | Yoshino |
| 8,201,853 B2 | 6/2012 | Tiberghien et al. |
| 8,746,746 B1* | 6/2014 | Schafer .................. F16L 47/32 285/133.11 |
| 2002/0079697 A1* | 6/2002 | Griffioen ............... F16L 41/023 285/123.1 |
| 2003/0184089 A1 | 10/2003 | Takayanagi |
| 2004/0061332 A1 | 4/2004 | Takayanagi |
| 2004/0066034 A1 | 4/2004 | Takayanagi |
| 2004/0183295 A1 | 9/2004 | Kasahara |
| 2005/0258646 A1 | 11/2005 | Gunderson |
| 2005/0272264 A1* | 12/2005 | Doherty .............. F16L 25/0045 438/690 |
| 2008/0157525 A1 | 7/2008 | Yoshino |
| 2008/0246274 A1 | 10/2008 | Feger et al. |
| 2008/0277015 A1* | 11/2008 | Tanaka ................... F16L 21/06 138/110 |
| 2009/0021003 A1* | 1/2009 | Poupore ................. F16L 21/06 285/131.1 |
| 2012/0068457 A1 | 3/2012 | Pisula, Jr. |
| 2013/0240048 A1 | 9/2013 | Dankbaar et al. |
| 2015/0084336 A1* | 3/2015 | Brown ................ F16L 25/0045 285/419 |
| 2015/0354741 A1 | 12/2015 | Montag |

FOREIGN PATENT DOCUMENTS

| | | |
|---|---|---|
| CN | 102434740 A | 5/2012 |
| WO | WO2013022356 | 2/2013 |

* cited by examiner

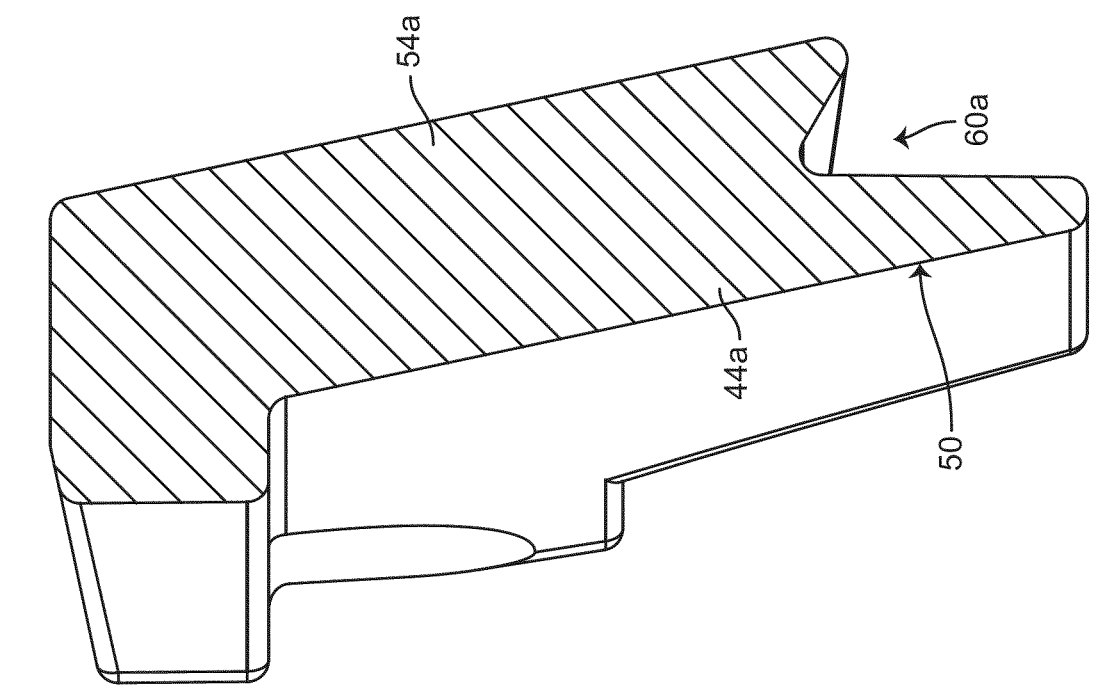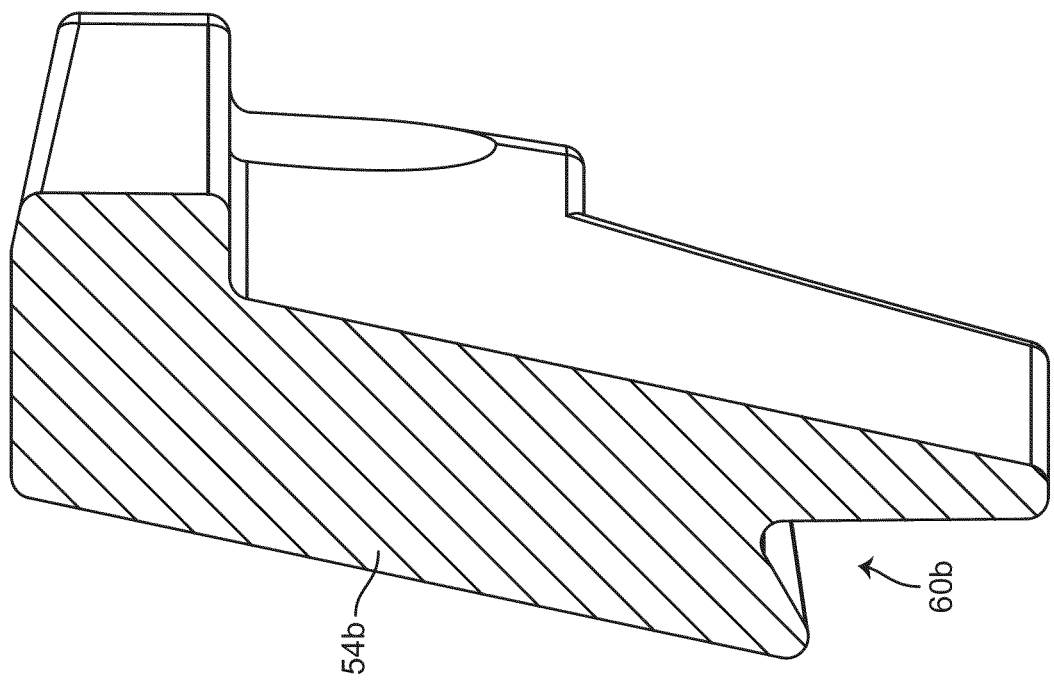
FIG. 9

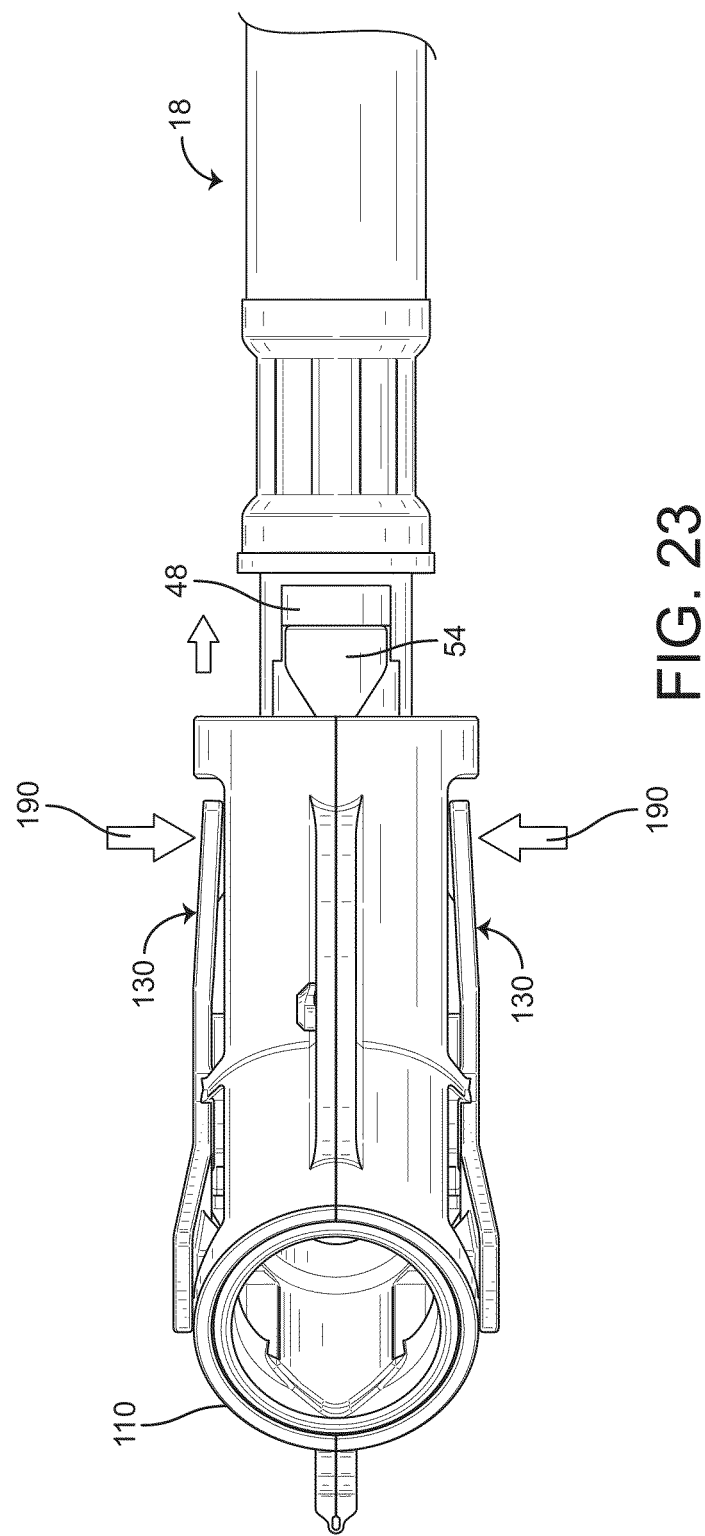

QUICK CONNECT RELEASE SYSTEM FOR A FLUID COUPLING

BACKGROUND

The present application relates generally to the field of joints or couplings for a fluid conduit. The present application relates more specifically to a quick connect and quick disconnect system for a fluid coupling.

Connecting and disconnecting water lines to and from a faucet may be difficult, as it is usually done in a dark, confined space under a cabinet. Threaded connections are often over-tightened which may lead to leaks, for example, via over-compression of an o-ring or cracking of the fitting. Conventional quick connectors may require properly aligning the pieces or actuation of small elements, which may be difficult to do under a cabinet. Other quick connectors may be difficult to disassemble, which may make repair or replacement of the faucet difficult. Accordingly, there is a need for an improved quick connect and quick release system.

SUMMARY

One implementation of the present disclosure is a quick connect and disconnect adaptor for a fluid coupling system. The adaptor includes a first half having a center point and a sidewall at least partially defining a plurality of bores. Each of the bores contains an aperture, and each of the bores terminates at the center point. The first half further includes a plurality of release tabs. Each of the release tabs is configured to resiliently deflect through an aperture, and each of the release tabs terminates at the center point. The adaptor further includes a second half. The second half is at least partially symmetric to the first half.

In some embodiments, the adaptor includes a hinge located between the first half and the second half. The hinge connects the first half to the second half, and the hinge permits the adaptor to travel between an open configuration and a closed configuration.

In some embodiments, the sidewall further defines a plurality of flanges. The flanges contain retention features to retain the adaptor in a closed configuration. In other embodiments, the second half is rotationally symmetric to the first half.

In some embodiments, the retention features include at least one peg and at least one hole. In other embodiments, the first half, the second half, and the hinge are fabricated as a unitary part. In other embodiments, the release tabs are further configured to transfer a compressive force to a fluid coupling fitting.

Another implementation of the present disclosure is a quick connect and disconnect system for a fluid coupling. The system includes an axially extending fitting configured to be secured to a fluid conduit. The system also includes a receiver. The receiver includes an end, a receiver sidewall at least partially defining a receiver bore extending axially from the end, and a lip at least partially defining a receiver aperture passing radially from the bore through the sidewall. The lip extends outwardly from the bore toward the end. The system further includes a clip coupled to the fitting. The clip includes a base, a first wing extending substantially axially from the base, and a first lug extending radially from the first wing. The end of the first lug that is away from the base extends radially and axially away from the first wing so as to define an undercut. The system further includes an adaptor. The adaptor includes a first adaptor sidewall at least partially defining a first adaptor bore containing a first adaptor aperture and a first release tab configured to resiliently deflect through the first adaptor aperture. When the clip is in an installed position, the first lug extends at least partially through the receiver aperture, and the lip is seated in the undercut.

In some embodiments, the adaptor is configured such that the receiver fits substantially within the adaptor. In other embodiments, the receiver and the adaptor are fabricated from different materials.

In some embodiments, the first release tab is further configured to transmit a compressive force to the first lug.

In some embodiments, the system further includes a second wing extending substantially axially from the base diametrically opposite the first wing, and a second lug extending radially from the second wing. The clip is configured such that the first wing and the second wing can resiliently deflect radially towards one another.

In some embodiments, the system further includes a second adaptor sidewall at least partially defining a second adaptor bore containing a second adaptor aperture, and a second release tab configured to resiliently deflect through the second adaptor aperture. The second release tab is located diametrically opposite the first release tab.

In some embodiments, to move the clip from the installed position to an uninstalled position, the clip moves axially away from the end to unseat the lip from the undercut, the first and second release tabs deflect the first and second lugs radially toward one another such that the lugs are within the bore, and the clip moves axially toward the end and out of the receiver.

Another implementation of the present disclosure is a quick connect and disconnect system for a fluid coupling. The system includes an axially extending fitting configured to be secured to a fluid conduit. The system further includes a clip coupled to the fitting. The clip includes a base, a first and a second wing extending substantially axially from the base, a first lug extending radially from the first wing, and a second lug extending radially from the second wing. The system further includes a quick connect and disconnect adaptor. The adaptor is configured to resiliently deflect the first lug and the second lugs radially toward one another in order to move the clip from an installed position to an uninstalled position.

In some embodiments, the system further includes a receiver that may be installed substantially within the adaptor.

In some embodiments, the adaptor further includes a first half and a second half. The second half is at least partially symmetric to the first half. The adaptor further includes a hinge located between the first half and the second half. The hinge connects the first half to the second half. In other embodiments, the hinge permits the adaptor to travel between an open configuration and a closed configuration.

In some embodiments, the receiver includes a receiver sidewall at least partially defining a receiver bore. In other embodiments, the adaptor includes an adaptor sidewall at least partially defining an adapter bore. The receiver bore and the adapter bore are substantially concentric when the receiver is installed substantially within the adaptor.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the

BRIEF DESCRIPTION OF THE DRAWINGS

FIG. 9 is a sectional elevation view of the clip of FIG. 8, shown according to an exemplary embodiment.

FIGS. 22-23 are elevation views of the quick connect release assembly of FIG. 15 in partially disassembled states, shown according to exemplary embodiments.

DETAILED DESCRIPTION

Quick Connect Assembly

Figure 1:
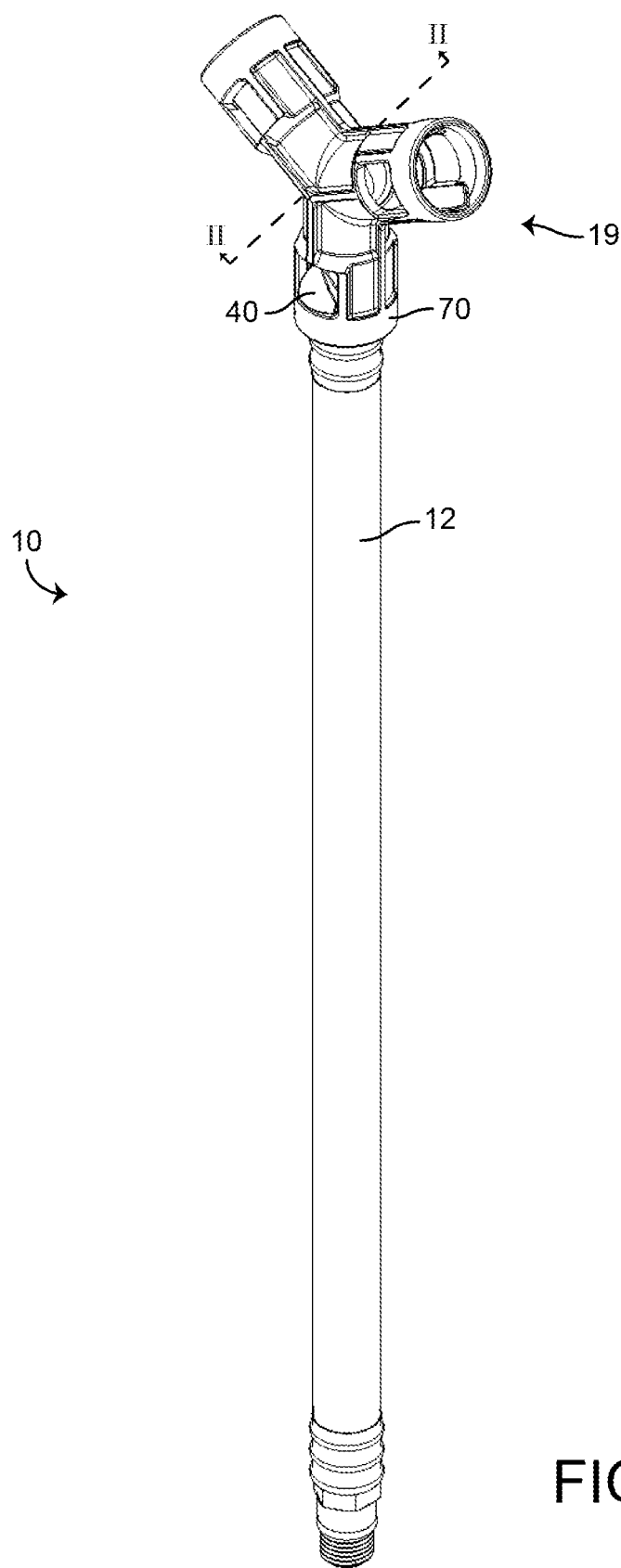
FIG. 1 is a perspective view of a quick connect assembly, shown according to an exemplary embodiment.
Figure 2:
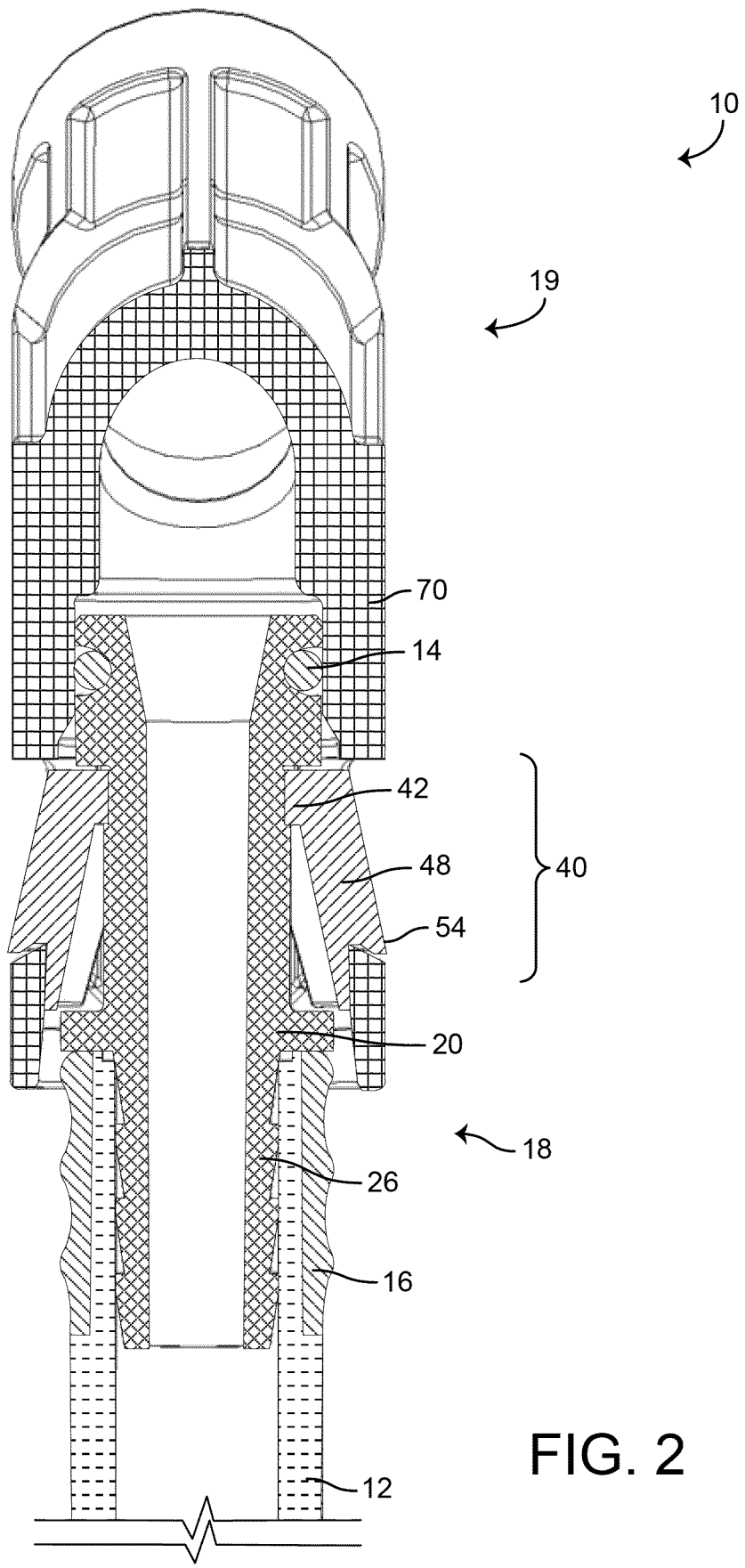
FIG. 2 is a sectional elevation view of the quick connect assembly of FIG. 1, shown according to an exemplary embodiment.

Referring generally to FIGS. 1-14, and particularly to FIGS. 1 and 2, a quick connect assembly 10 and components thereof are shown according to an exemplary embodiment. The quick connect assembly 10 includes a male assembly 18 and a female assembly 19 (shown as a Tee) having a receiver 70. The male assembly 18 includes a fitting 20 secured to a fluid conduit (line, pipe, etc.), shown as a hose 12. A clip 40 is coupled to the fitting 20 and releasably couples the male assembly 18 to the female assembly 19. A seal 14 is coupled to the fitting 20 and seals between the male assembly 18 and the female assembly 19.

When assembled, the fitting 20 and the receiver 70 are connected together such that fluid (e.g., water) may flow from the hose 12 into the receiver 70. Another assembly may be installed into another end of the Tee, thereby providing a sealed fluid pathway from one fluid conduit to another. While the receiver 70 is shown to be a Tee, the receiver may have any number of ends (e.g., a single ended terminal, a two-ended coupling, a four or more ended distributor, etc.).

Before discussing further details of the quick connect assembly and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 3:
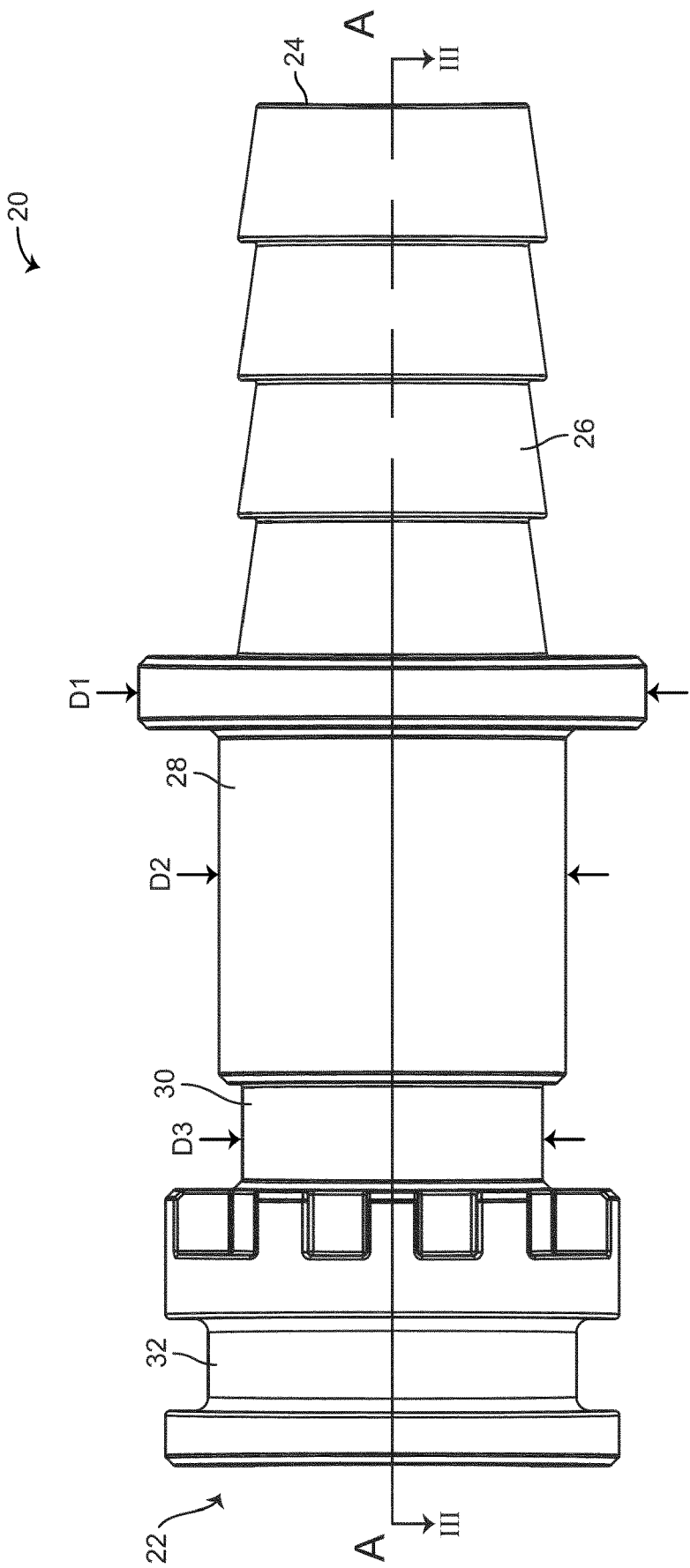
FIG. 3 is an elevation view of a fitting of the quick connect assembly of FIG. 1, shown according to an exemplary embodiment.
Figure 4:
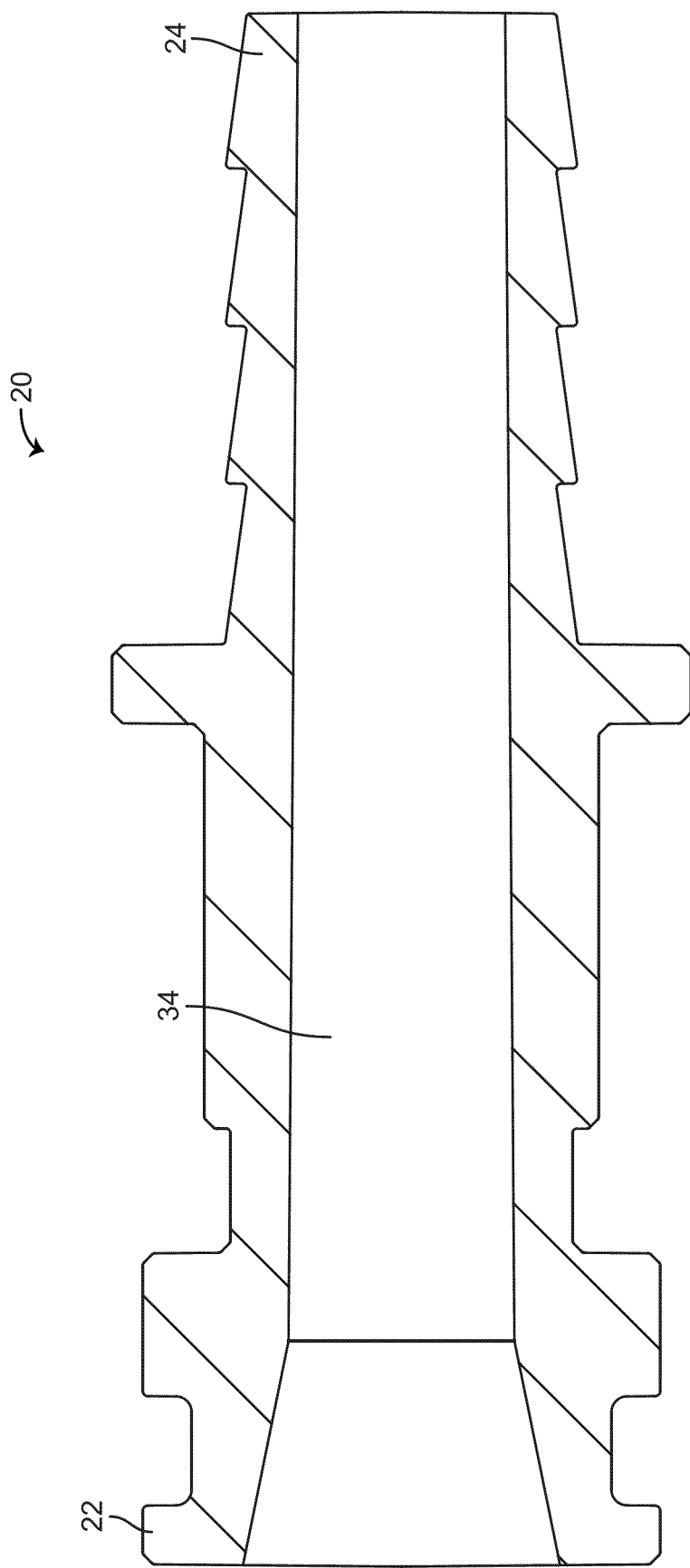
FIG. 4 is a sectional elevation view of the fitting of FIG. 3, shown according to an exemplary embodiment.
Figure 5:
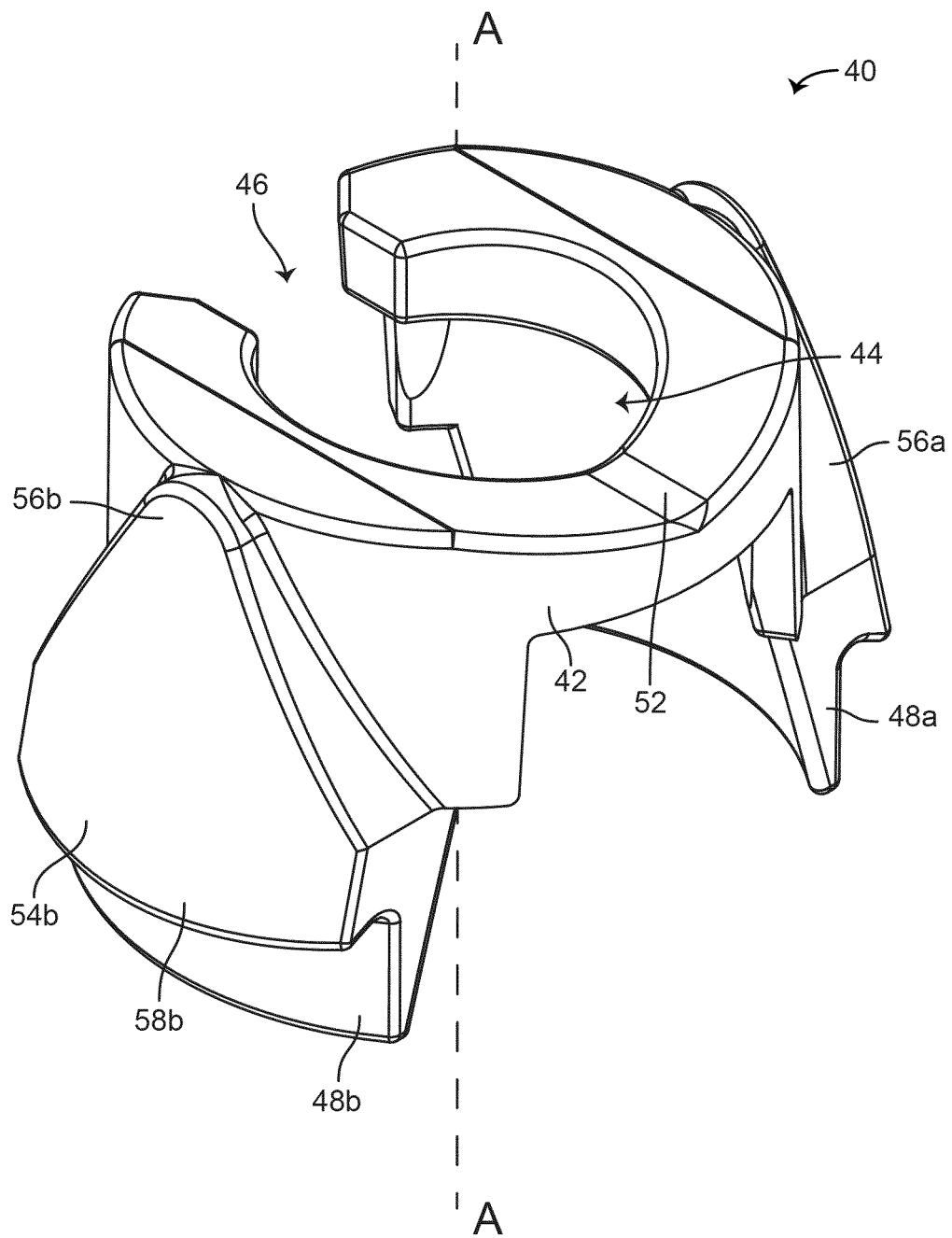
FIG. 5 is a perspective view of a clip of the quick connect assembly of FIG. 1, shown according to an exemplary embodiment.
Figure 6:
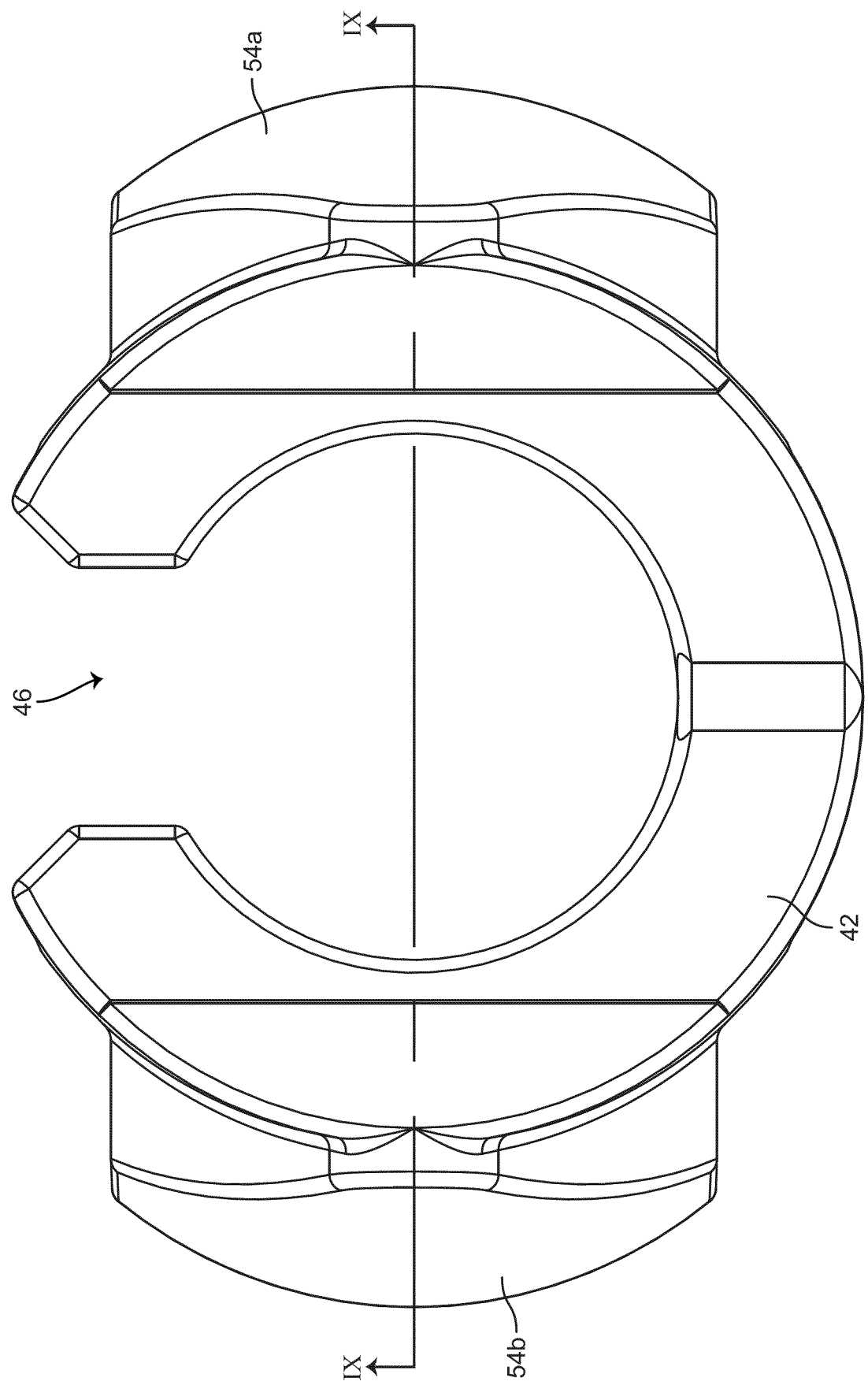
FIG. 6 is an axial plan view of the clip of FIG. 5, shown according to an exemplary embodiment.
Figure 7:
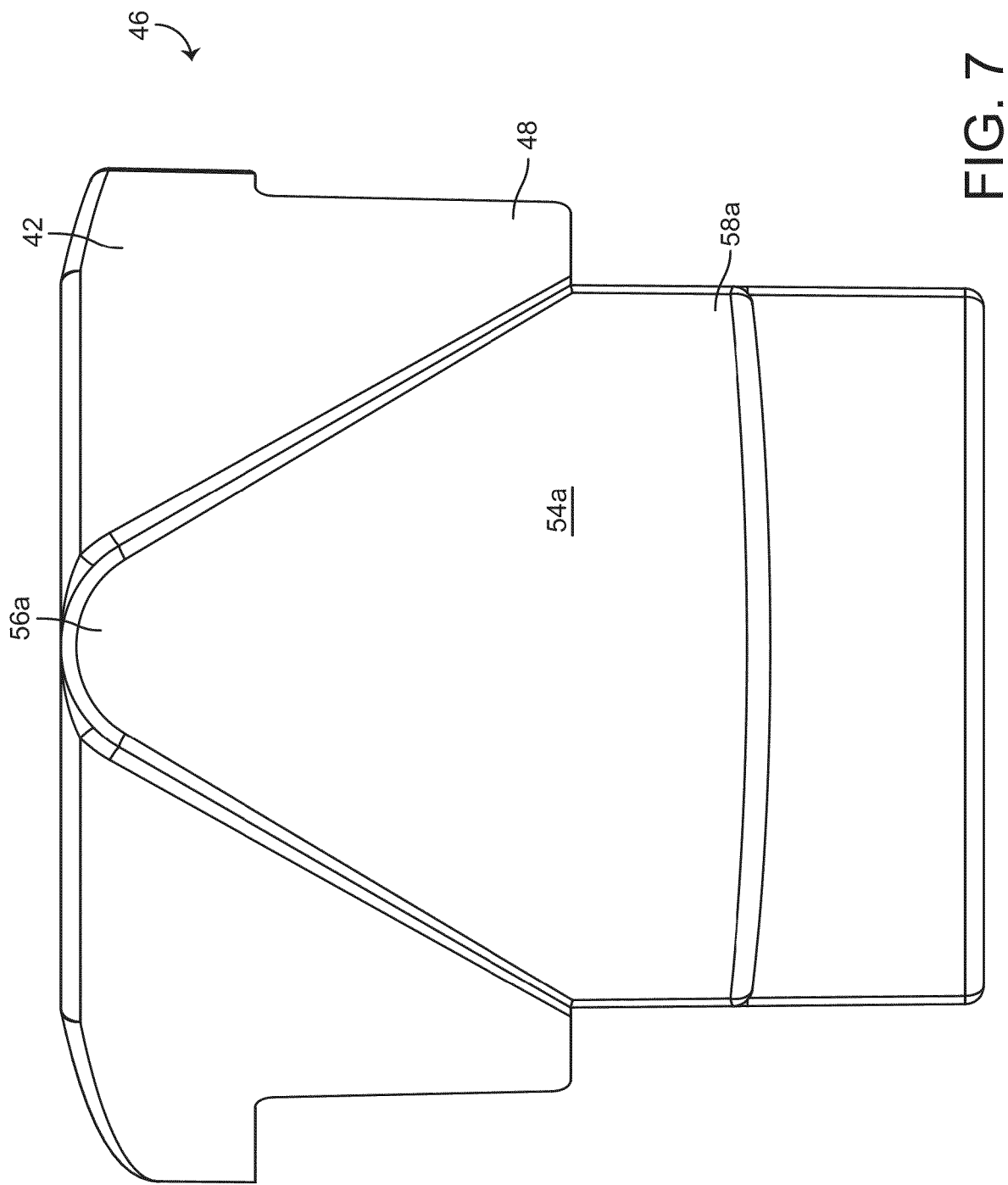
FIG. 7 is an elevation view of the clip of FIG. 5, shown according to an exemplary embodiment.
Figure 8:
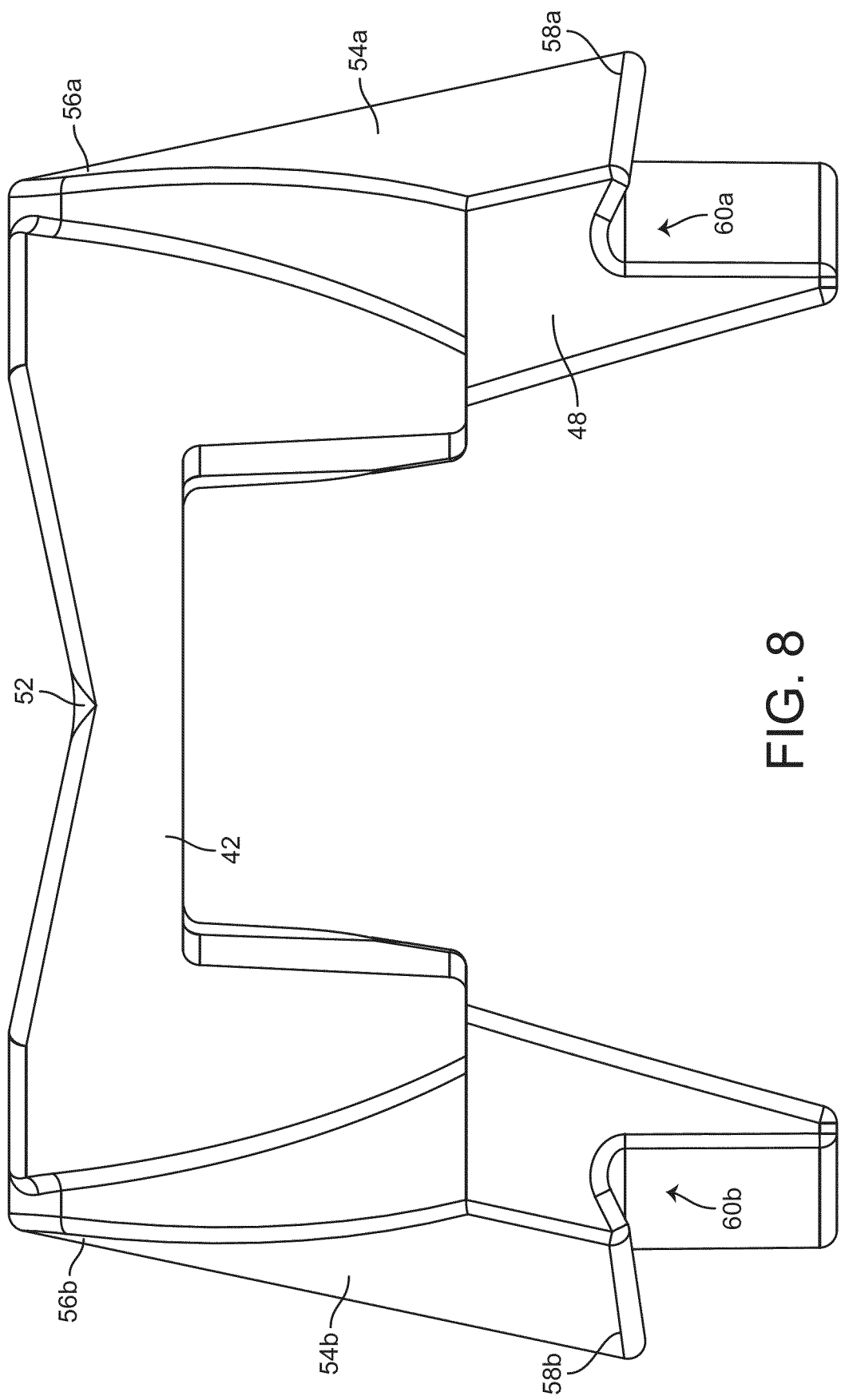
FIG. 8 is an elevation view of the clip of FIG. 5, shown according to an exemplary embodiment.

Referring to FIGS. 3 and 4, a fitting 20 is shown, according to an exemplary embodiment. The fitting 20 is shown to extend axially along an axis A and to include a first end 22 that is axially spaced from a second end 24 that is configured to be secured to the hose 12. For example, the second end 24 includes a plurality of barbs 26 over which the hose 12 may pass, and then a clamp 16 (see, e.g., FIG. 10) may be crimped onto the hose 12 and the fitting 20.

The fitting 20 has an outer periphery having a first diameter D1 and a recessed body portion 28 having a second diameter D2, which is less than the first diameter D1. The fitting 20 defines a first groove 30 (e.g., annular groove, slot, etc.) having a third diameter D3, which is less than the second diameter D2. The first groove 30 is shown to be annular. The fitting 20 is further shown to define a second groove 32 (e.g., annular groove, slot, etc.) located between the first groove 30 and the first end 22. The second groove 32 is configured to receive a seal 14 (e.g., o-ring, sealing element, etc.). A passageway 34 (e.g., bore, hole, etc.) configured to permit fluid to flow through the fitting 20 extends axially through the fitting 20. The fitting 20 may be made of any suitable material. For example, the fitting 20 may be made of metal, brass, stainless steel, composite, plastic, polyphenylsulfate, etc.

Referring to FIGS. 5-9, a clip 40 is shown, according to an exemplary embodiment. The clip 40 includes a base 42 through which axis A is shown to pass. According to the exemplary embodiment shown, the base 42 has a "C" shape that extends circumferentially substantially around the axis A. The base 42 defines an opening 44 and a gap 46 extending radially from the opening 44 through the base 42. The diameter D3 of the fitting 20 at the first groove 30 and the base 42 are configured to allow the fitting 20 to be forced through the gap 46 and be retained in the opening 44 of the clip 40. Accordingly, the clip 40 may be snapped onto the fitting 20. Further, the axial length of the first groove 30 is shown to be similar to the thickness of the base 42, thus limiting axial movement of the clip 40 when coupled to the fitting 20. According to another embodiment, the base 42 may be of other suitable shapes. For example, the base 42 may extend fully around the fitting 20. The clip 40 may be formed of any suitable material, e.g., metal, plastic, polyoxymethylene, etc.

According to the exemplary embodiment shown, the clip 40 includes a wing 48 (shown as a first wing 48a and a second wing 48b) that extends substantially axially from the base 42. According to the exemplary embodiment shown, the first wing 48a and the second wing 48b are radially or diametrically opposite one another. Briefly referring to FIGS. 8 and 9, an inner surface 50 of the wings 48 extend radially outward as the wings 48 extend axially from the base 42. Accordingly, when the wings 48 are forced radially towards one another, the wings 48 do not interfere with the fitting 20. Further, the thickness of the base 42 is shown to decrease to a minimum 52 between the wings 48, thereby facilitating flexing of the base 42 when the wings 48 are forced radially together. Accordingly, when the first and second wings 48a, 48b are pushed towards one another (e.g., squeezed), the wings 48 resiliently deflect towards one another. While the exemplary embodiment is shown to have two wings 48, it is contemplated that the clip 40 may have one, three, or more wings 48.

A lug 54 (shown as a first lug 54a and a second lug 54b) extends radially from each of the wings 48. According to the embodiment shown, the lugs 54 have a delta shape having a narrow end 56 proximate the base 42 and a broad end 58 distal the base 42. Briefly referring to FIGS. 7 and 8, the end of the lug 54 that is distal the base 42 (e.g., the broad end 58) extends radially and axially away from the wing 48 so as to define an undercut 60.

Figure 10:
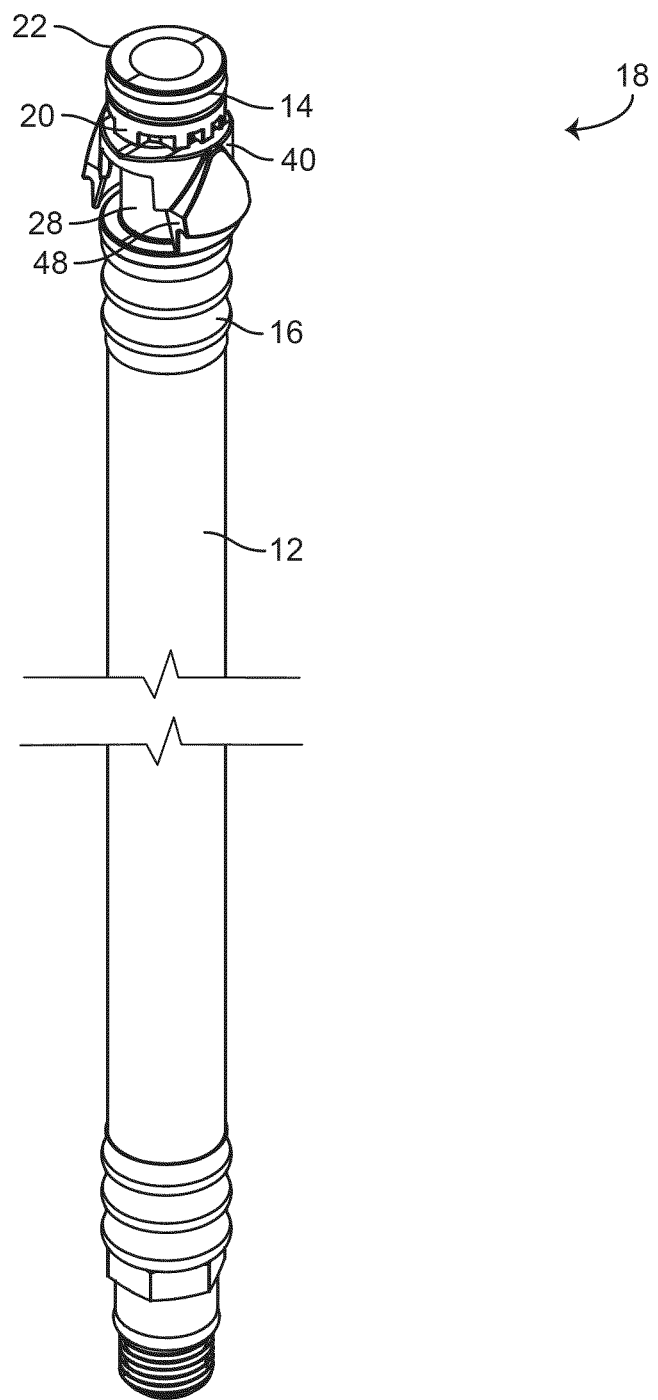
FIG. 10 is a perspective view of a male assembly of the quick connect assembly of FIG. 1, shown according to an exemplary embodiment.
Figure 11:
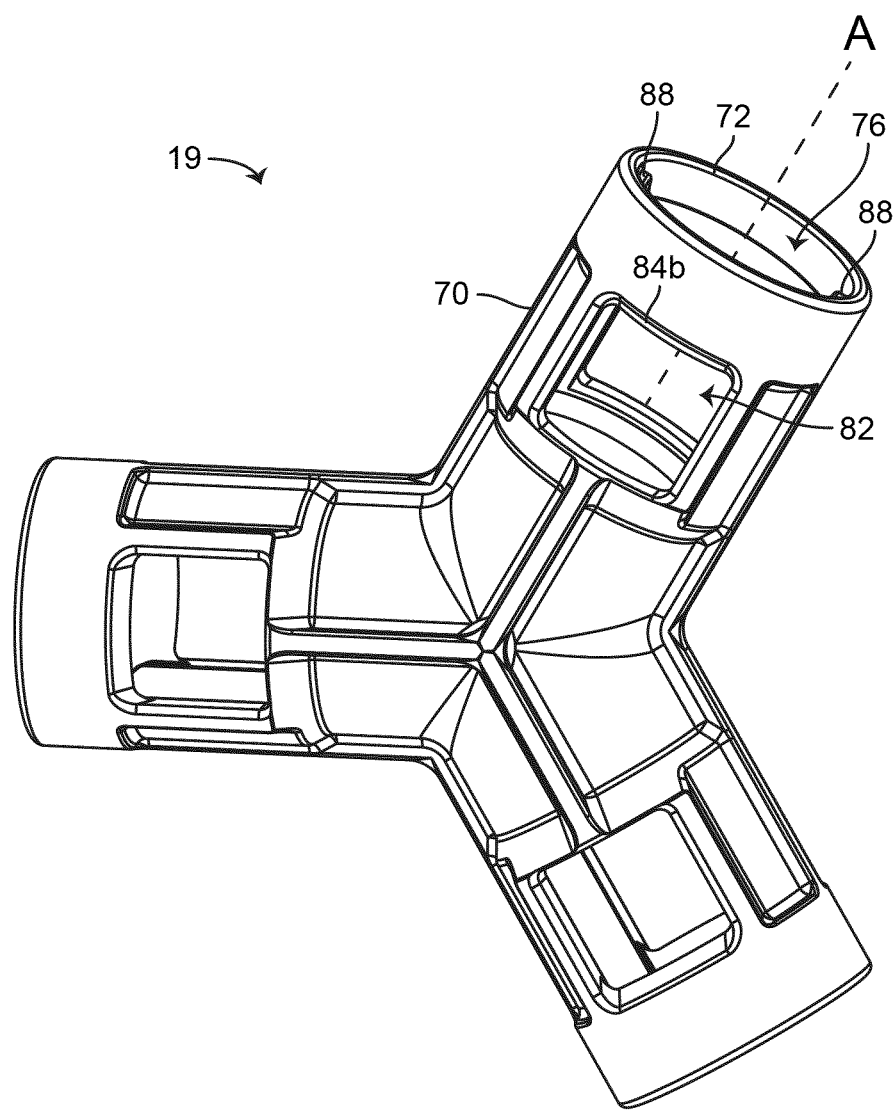
FIG. 11 is a perspective view of a female assembly of the quick connect assembly of FIG. 1, shown according to an exemplary embodiment.
Figure 12:
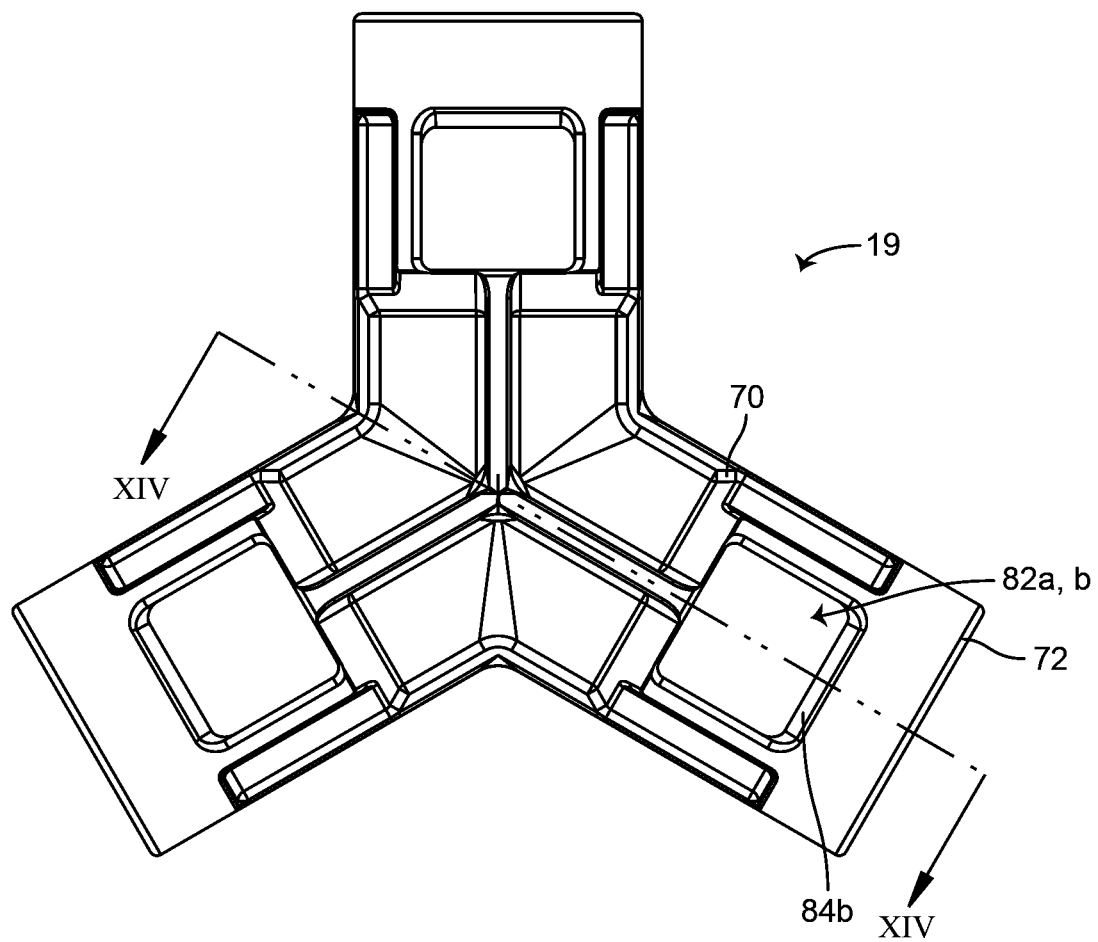
FIG. 12 is an elevation view of the female assembly of FIG. 11, shown according to an exemplary embodiment.

Referring to FIG. 10, a male assembly 18 is shown according to an exemplary embodiment. The male assembly 18 is shown to include the fitting 20 secured to the hose 12 via crimped clamp 16. The clip 40 is coupled to the fitting 20, and the wings 48 extend over the recessed body portion 28 of the fitting 20. The seal 14 is coupled to the fitting 20 between the first end 22 and the clip 40.

Referring to FIGS. 11-14, a female assembly 19 (shown as a Tee connector), is shown according to an exemplary embodiment. The female assembly 19 is shown to have three receivers 70, which are each configured to couple to a male assembly 18. According to other embodiments, the female assembly 19 may have a different number of receivers 70, and the other ends of the female assembly 19 may have a different type of connection (e.g., threaded, bayonet, friction, etc.). Further, as the male assemblies 18 may plug into multiple sides of the female assembly 19, it is contemplated that fluid may flow in either direction through the male assembly 18.

Figure 13:
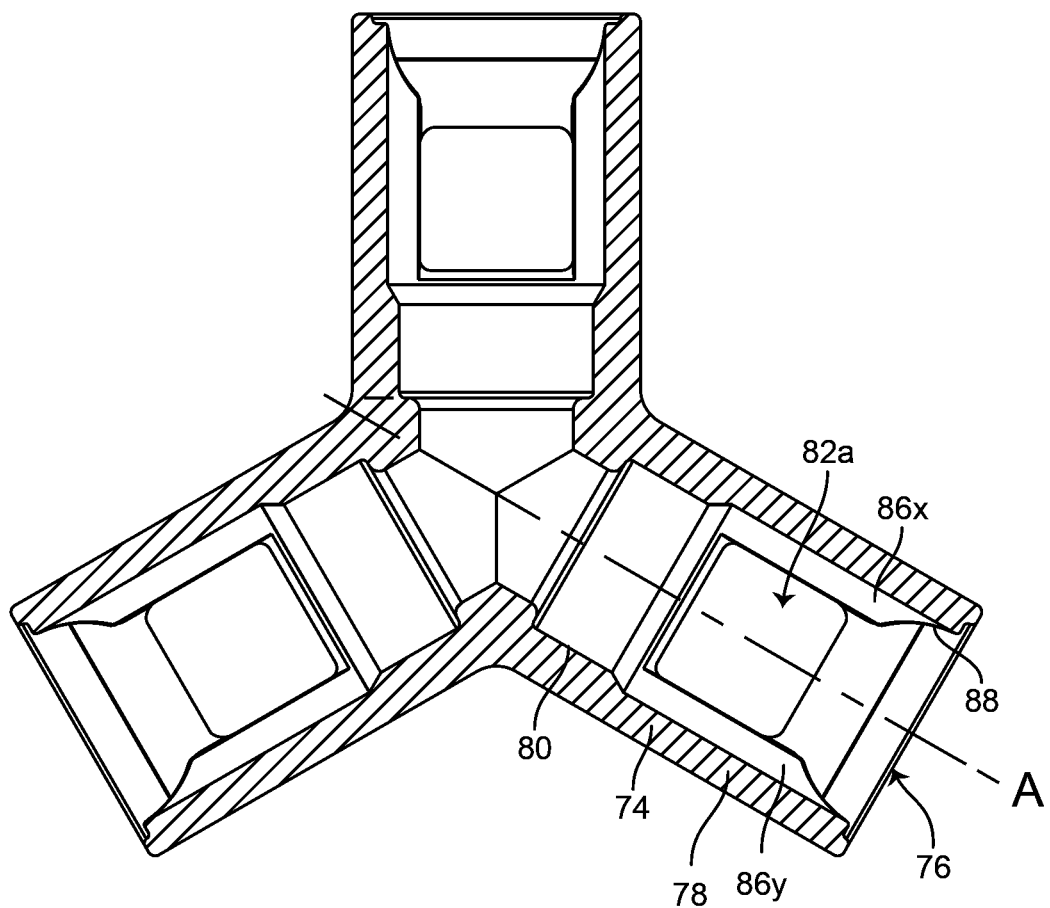
FIG. 13 is a sectional elevation view of the female assembly of FIG. 11, shown according to an exemplary embodiment.

The receiver 70 includes an end 72 and a sidewall 74 extending axially from the end 72. The sidewall 74 at least partially defines a bore 76. According to the exemplary embodiment (as best seen in FIG. 13), the sidewall 74 includes a first portion 78 that is proximal (e.g., nearer, closer, etc.) to the end 72 and a second portion 80 that is distal (e.g., farther) from the end 72. As shown, the second portion 80 has a narrower diameter than the first portion 78. When the clip 40 is in the installed position, the seal 14 seals (e.g., sealingly engages) between the fitting 20 and the second portion 80 of the sidewall 74.

Figure 14:
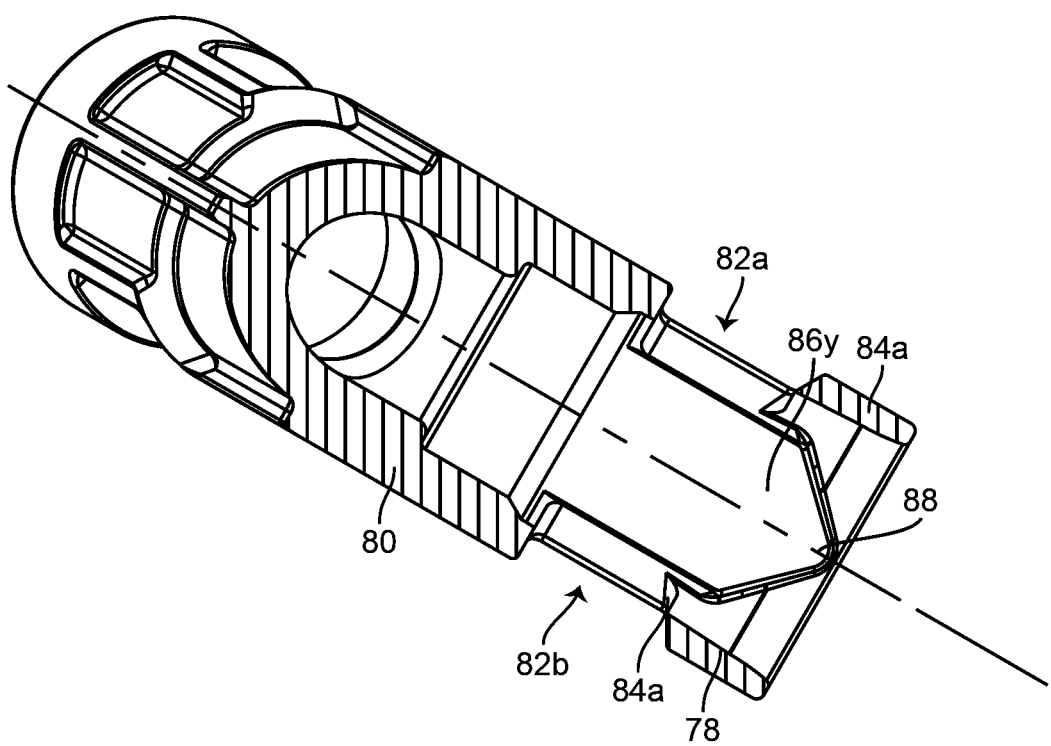
FIG. 14 is a sectional elevation view of the female assembly of FIG. 11, shown according to an exemplary embodiment.

An aperture 82 (show as first aperture 82a and second aperture 82b) passes from the bore 76 through the sidewall 74. According to the embodiment shown, the aperture 82 is defined by the sidewall 74 and a lip 84, and the aperture 82 passes radially outwardly through the sidewall 74. Referring briefly to FIG. 14, the lip 84 extends outwardly from the bore 76 toward the end 72.

When the clip 40 is in an installed position (see, e.g., FIGS. 1 and 2), the lug 54 extends at least partially through the aperture 82. According to the exemplary embodiment shown, the first lug 54a at least partially extends through the first aperture 82a, the second lug 54b at least partially extends through the second aperture 82b, and the lips 84a, 84b are seated in the respective undercuts 60a, 60b. Accordingly, when the clip 40 is in the installed position, axial force trying to push the clip 40 out of the receiver 70 (e.g., water pressure in the quick connect assembly 10, pulling on hose 12, etc.) will force the lip 84 into the undercut 60, thereby preventing the quick connect assembly 10 from disassembling. Thus, the quick connect assembly 10 inhibits a user from uncoupling the clip 40 and the receiver 70 before fluid pressure has been relieved from the system (e.g., hose 12 has been drained).

The receiver 70 is further shown to include a guide 86 (shown in FIG. 14) extending radially inward from the sidewall 74 into the bore 76. The guide 86 is configured to rotationally urge the lug 54 toward the aperture 82 as the clip 40 is moved from an uninstalled position to the installed position. As shown, the guide 86 includes a narrower end 88 that is closer (e.g., nearer, proximal, etc.) to the end 72 of the receiver 70 and includes a broader end farther (e.g., distal, etc.) from the end 72 of the receiver 70. Accordingly, as the clip 40 is moved from the uninstalled position to the installed position, the guide 86 rotates the clip 40 in response to the axial force, thereby orienting the lug 54 to the aperture 82. According to the exemplary embodiment shown, the first guide 86x and the second guide 86y are located radially opposite one another, and both the first guide 86x and the second guide 86y are located substantially orthogonal to the first aperture 82a and the second aperture 82b. According to one embodiment, the plurality of lugs 54 and the plurality of apertures 82 are evenly spaced around axis A. Thus, each lug 54 is guided to an aperture 82 in response to axial force, without the user needing to actively or consciously try to orient the lugs 54 and the apertures 82.

Assembly and installation of the quick connect assembly 10 will now be described according to an exemplary embodiment, with reference to the exemplary embodiment shown in the figures. The fitting 20 is coupled to hose 12. The second end 24 of the fitting 20 is inserted into the hose 12, and the clamp 16 is crimped over the hose 12 and barbs 26 to secure the fitting 20 to the hose 12. The base 42 of the clip 40 is coupled to the fitting 20 by inserting the base 42 into the first groove 30. A seal 14 is seated into the second groove 32.

The male assembly 18 is then inserted into the female assembly 19. The first end 22 of the fitting 20 is pushed axially (e.g., positive axial force) into the bore 76 of the receiver 70, past the end 72 of the receiver 70. The narrow end 56 of the lug 54 will end up on one side (e.g., left or right, clockwise or counterclockwise, etc.) or the other (e.g., right or left, counterclockwise or clockwise, etc.) of the narrower end 88 of the guide 86. Which side the narrow end 56 ends up on is not necessarily important in the embodiment shown; however, the general narrowness of the narrow end 56 and the narrower end 88 facilitates the two ends 56, 88 being offset from one another and reduces the chance that the two ends 56, 88 will end up abutting one another in a stalemate. As the male assembly 18 is further forced axially into the receiver 70, the angled interfaces of the guide 86 and the lug 54 cause the clip 40 to rotate such that the lugs 54 are guided to the apertures 82.

As the clip 40 is installed into the receiver 70, the wings 48 are deflected radially toward one another by the sidewall 74. As described above, the angled inner surface 50 of the wing 48 and the reduced diameter D2 of the recessed body portion 28 allow the clip 40 to deflect (e.g., flex, collapse, etc.) to at least partially within the outer periphery of the fitting 20, thereby facilitating insertion of the clip 40 into the receiver 70.

When the lugs 54 axially and rotationally reach the apertures 82, the clip 40 and the wings 48 resiliently return to a relaxed state, and the lugs 54 at least partially extend through the apertures 82. Contact between components may cause an audible noise (e.g., a click) or may cause a tactile or haptic feeling that is/are observable by the user to communicate that the wings 48 have returned to the relaxed state and/or that the lugs 54 have at least partially extended through the apertures 82. A negative axial force may be applied to the male assembly 18 (e.g., by pulling on the hose 12, by creating fluid pressure in the quick connect assembly 10, etc.). The negative axial force causes the lips 84 to seat into the undercuts 60. The clip 40 is in an installed position, and during installation, the seal 14 has sealingly engaged the sidewall 74, creating a sealed fluid pathway through the quick connect assembly 10.

Disconnection of the quick connect assembly 10 will now be described according to an exemplary embodiment. According to an exemplary embodiment, fluid flow to the quick connect assembly 10 should be stopped, and fluid pressure in the quick connect assembly 10 should be relieved. The lips 84 are unseated from the undercuts 60 by moving the clip 40 in a positive axial direction (e.g., further into the bore 76, etc.). The angles of the undercut 60 and the lip 84 are configured to transfer radial forces into axial forces. For example, a user may squeeze (e.g., apply a compressive force) the lugs 54 together (e.g., toward one another), and the interface of the undercut 60 and the lip 84 causes at least some of the force to be transferred into a positive axial force. When the broad end 58 of the lug 54 has moved over the lip 84, the clip 40 and/or the wings 48 may deflect such that the lugs 54 may move radially to within the bore 76. When the components of the clip 40 are within the bore 76, the clip 40 may be moved axially (e.g., negative axial force) toward the end 72 of the receiver 70 and out of the receiver 70. For example, the male assembly 18 may be withdrawn from the receiver 70 by pulling on the hose 12.

Quick Connect Release Assembly

Figure 15:
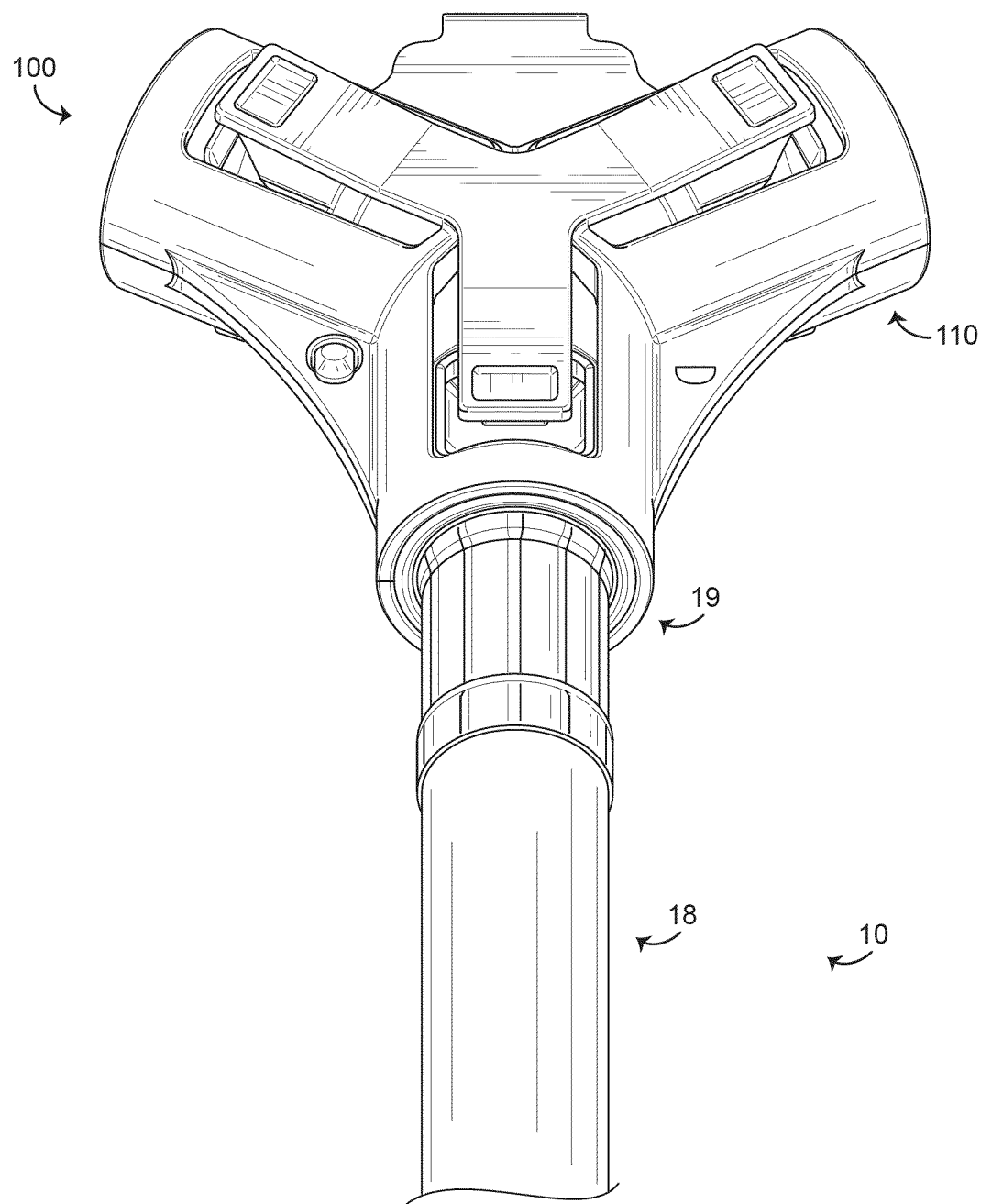
FIG. 15 is a perspective view of a quick connect release assembly, shown according to an exemplary embodiment.

Referring generally to FIGS. 15-23, and particularly to FIG. 15, a quick connect release assembly 100 and components thereof are shown according to an exemplary embodiment. In very low visibility or very space-limited situations (e.g., a small, dark bathroom cabinet, etc.), a user may desire a disconnect mechanism for a fluid coupling that is easier to locate and operate than the standard disconnect procedure of compressing lugs 54 of male assembly 18. In these circumstances, use of quick connect release assembly 100 may be particularly helpful. Quick connect release assembly 100 includes quick connect assembly 10 and all the components it comprises (e.g., male assembly 18 and female assembly 19). Release assembly 100 also includes quick connect release adaptor 110, which may be installed over and surrounding the female assembly 19 of quick connect assembly 10 in order to facilitate ease of decoupling of male assembly 18 from female assembly 19.

Figure 16:
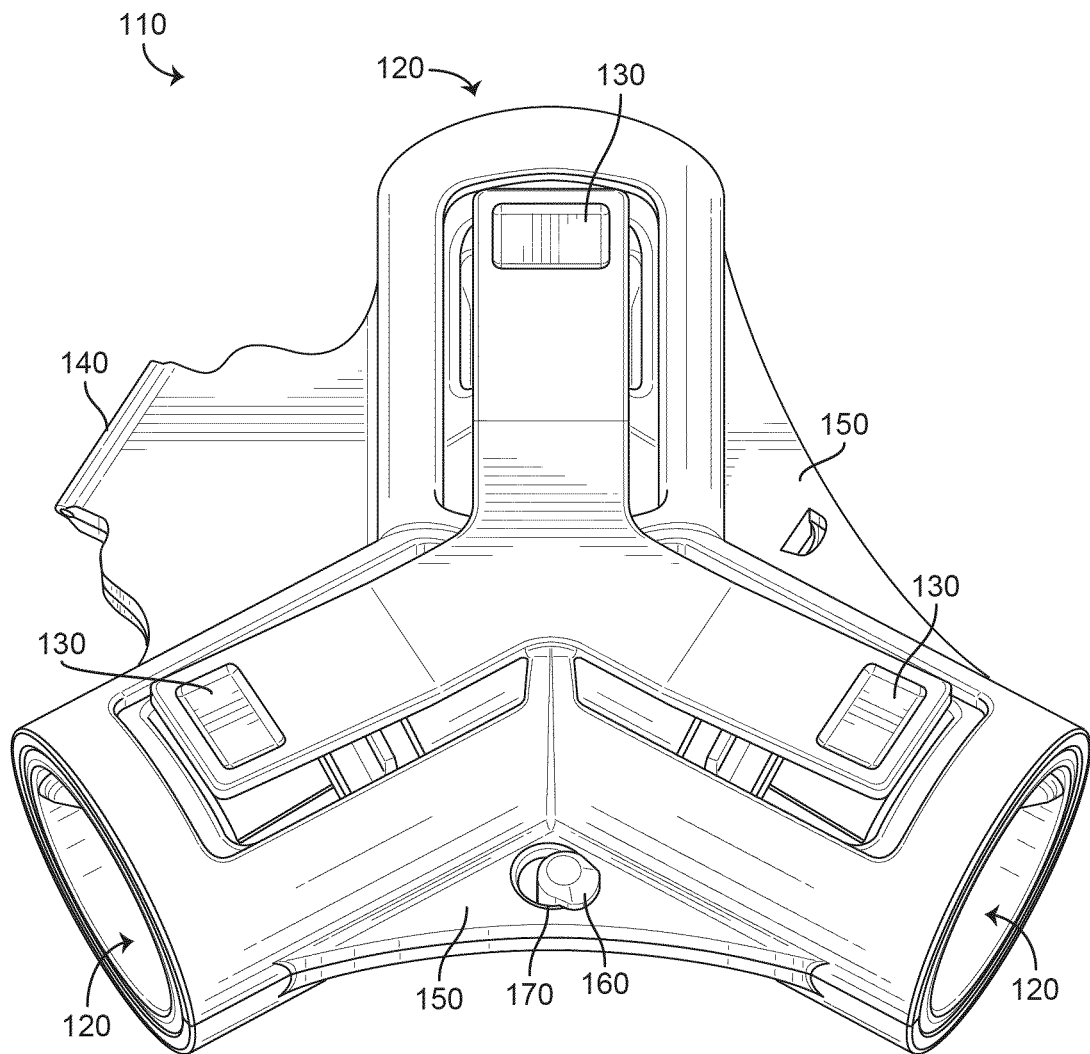
FIG. 16 is a perspective view of a quick connect release adaptor, shown according to an exemplary embodiment.

Turning now to FIG. 16, a perspective view of quick connect release adaptor 110 is shown, according to an exemplary embodiment. Quick connect release adaptor 110 may be a separate component from male assembly 18 and female assembly 19, and thus may be installed whenever convenience is desired (e.g., the low visibility or space-limited scenarios described above). Quick connect release adaptor 110 includes a plurality of adaptor bores 120, a plurality of release tabs 130, and a clamshell hinge 140. For example, as depicted in FIG. 16, release adaptor 110 may contain three bores arranged in a Tee connector shape, with each bore terminating at a common center point, to match the contours of female assembly 19. Clamshell hinge 140 permits the symmetrical halves of release adaptor 110 to be maneuvered into an open configuration in order to receive and retain female assembly 19. The open configuration of release adaptor 110 will be discussed in greater detail in FIGS. 18 and 20 below. Still referring to FIG. 16, adaptor 110 further includes flanges 150, which function to connect the adaptor bores 120 that are not connected via hinge 140. Flanges 150 additionally contain closure pegs 160 and peg receiver holes 170, features which may function to retain release adaptor 110 in a closed configuration. These retention features will be discussed in greater detail in FIGS. 18-19 below.

Figure 17:
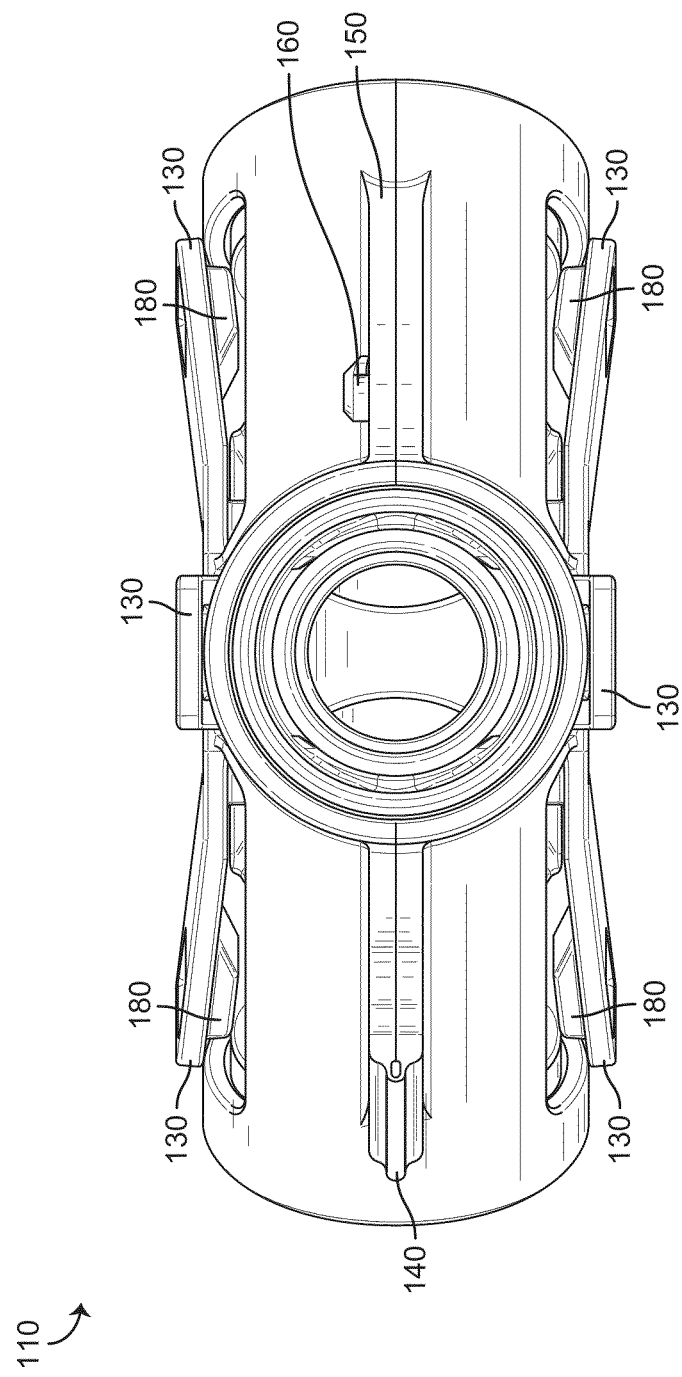
FIG. 17 is an elevation view of the quick connect release adaptor of FIG. 16, shown according to an exemplary embodiment.

Referring now to FIG. 17, an elevation view of the quick connect release adaptor 110 is shown, according to an exemplary embodiment. A plurality of release tabs 130 may correspond with the number of adaptor bores 120 such that each bore 120 has a pair of tabs 130. In various embodiments, release tabs 130 may be sized such that a user may easily locate the tabs without having actual visibility of adaptor 110. As shown in FIG. 17, each pair of release tabs 130 may be located diametrically from each other such that a user may easily apply a compressive force (e.g., using a thumb and a forefinger) to the tabs. In other embodiments, release tabs 130 may be arranged in a variety of different orientations.

Still referring to FIG. 17, while in a neutral position, release tabs 130 may be angled slightly outward from adaptor 110 with respect to the major axes of bores 120. Tabs 130 may additionally exhibit some spring-like qualities to permit tabs 130 to resiliently deflect through apertures 135 when a compressive force is applied (see FIG. 18 for further description of apertures 135), and to snap back to the neutral position when the compressive force is removed. In various embodiments, each release tab 130 may also comprise a corresponding tab protrusion 180. Tab protrusion 180 may function to transfer a compressive force a user exerts on release tab 130 to lugs 54 of male assembly 18. By compressing lugs 54, the user may decouple male assembly 18 from female assembly 19. This function will be discussed in greater detail below with respect to FIGS. 22-23.

Figure 18:
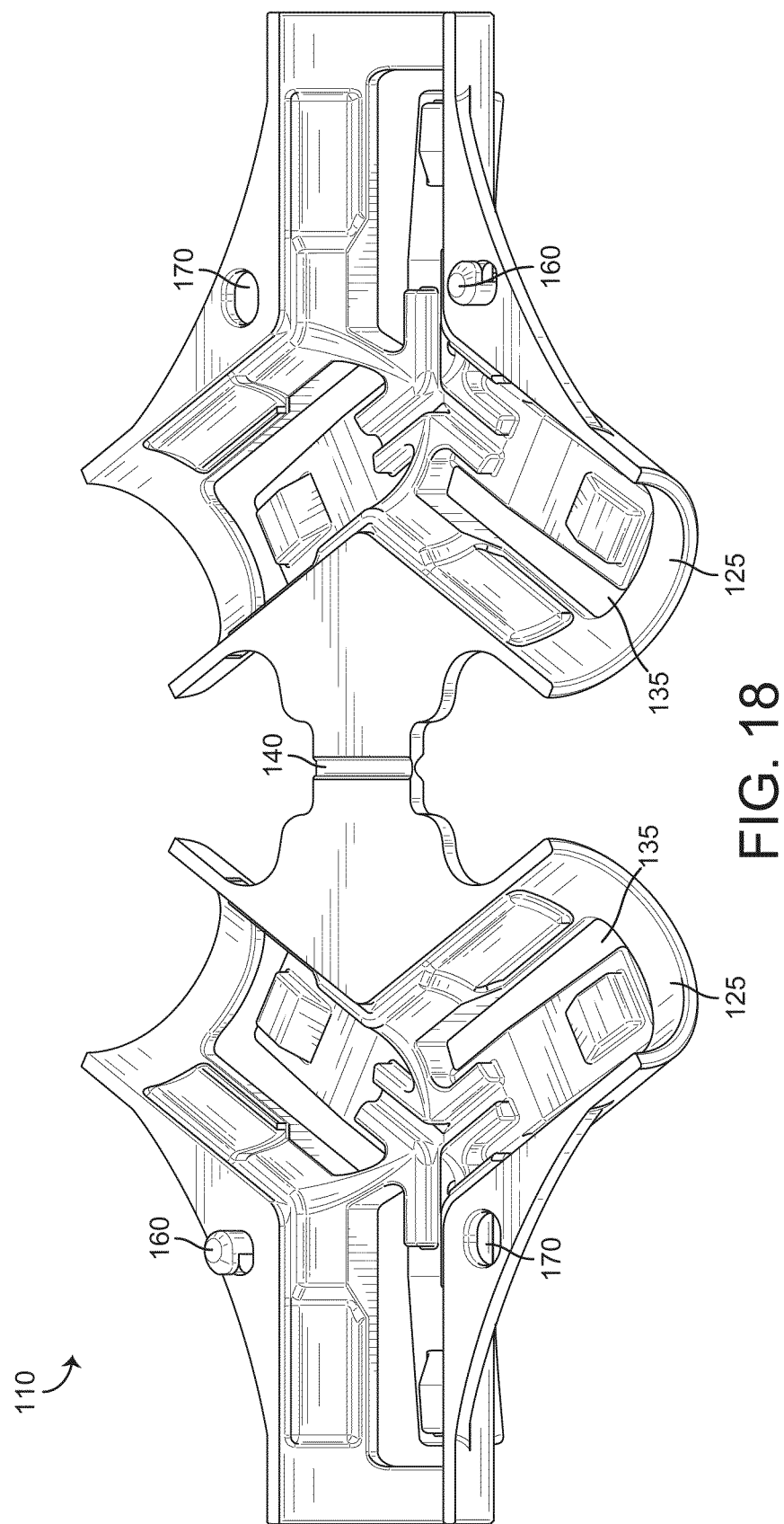
FIG. 18 is a perspective view of the quick connect release adaptor of FIG. 16 in an open configuration, shown according to an exemplary embodiment.

Referring now to FIG. 18, a perspective view of quick connect release adaptor 110 is shown in an open configuration, according to an exemplary embodiment. As described above, release adaptor 110 may be comprised of symmetrical halves joined via clamshell hinge 140. For example, as shown in FIG. 18, each half of adaptor 110 has 180° rotational symmetry about the center point of the part such that when adaptor 110 is maneuvered to a closed configuration, each closure peg 160 of flange 150 may mate with peg receiver hole 170 of flange 150 on the other symmetrical half. Each symmetrical half of adaptor 110 may comprise a common sidewall 125 that may partially define the plurality of bores 120. As described above, bores 120 may terminate at a common center point, and sidewall 125 may be shaped to match the contours of female assembly 19 (e.g., extruded bosses on adaptor 110 may correspond to recesses on female assembly 19, etc.). Sidewall 125 may also define a plurality of apertures 135, with each aperture 135 corresponding to a release tab 130. The plurality of release tabs 130 may be joined at a common point (e.g., the center point) of each symmetrical half of adaptor 110. As described above, release tabs 130 may exhibit spring-like features in the presence of compressive forces, and the common point may also serve as a fulcrum for tabs 130 as they deflect relative to apertures 135.

Figure 19:
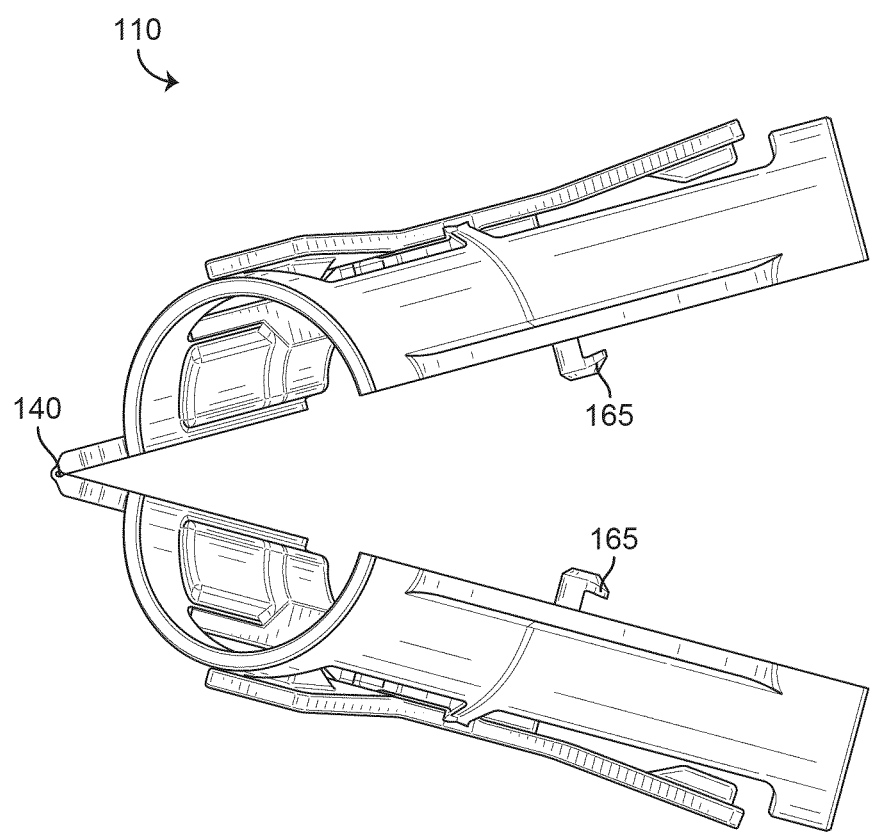
FIG. 19 is a perspective view of the quick connect release adaptor of FIG. 16 in a partially closed configuration, shown according to an exemplary embodiment.

Turning now to FIG. 19, a perspective view of quick connect release adaptor 110 in a partially closed configuration is shown, according to an exemplary embodiment. As described above, closure pegs 160 may function to retain release adaptor 110 in a closed configuration. As a user moves adaptor 110 from an open configuration to a closed configuration, the flanges 150 that may include closure pegs 160 and peg receiver holes 170 move closer to each other. As flanges 150 move closer until they are ultimately flush, the flared ends 165 of closure pegs 160 may pass through peg receiver holes 170. Once flanges 150 are flush with each other, flared ends 165 may fully protrude from receiver holes 170. In some embodiments, flared ends 165 may provide a compressive force on flanges 150, serving to retain adaptor 110 in a closed configuration. Although adaptor 110 is depicted with a pair of closure pegs 160 and corresponding peg receiver holes 170, in other embodiments, a plurality of pegs 160 and holes 170 may be utilized to retain adaptor 110 in a closed configuration. In still other embodiments, various other mechanisms may be utilized to retain release adaptor 110 in a closed configuration (e.g., threaded fasteners, friction fittings, etc.).

Quick connect release adaptor 110 may be formed or constructed from a variety of materials and in a variety of manners. For example and in one embodiment, adaptor 110 may be of unitary construction (i.e., all one piece), where adaptor 110 may be molded, extruded, cast, formed/machined etc. In another embodiment, instead of comprising symmetrical halves of a unitary part, adaptor 110 may be fabricated as separate components. The separate components may then be permanently joined to form adaptor 110 as a unitary part, or the components may be temporarily joined to form adaptor 110 when quick connect release assembly 100 is in a fully installed state. Accordingly, adaptor 110 may be constructed from any suitable material, including, but not limited to, plastic, composites, metal, metal alloys, and/or any combination thereof. By fabricating adaptor 110 as a separate component from female assembly 19, material for adaptor 110 may be cost and performance optimized for the functions of adaptor 110 alone, without regard to the needs of female assembly 19. In addition, because adaptor 110 is fully separable from female assembly 19, any failure of adaptor 110 does not compromise the functionality or safety of the hydraulic connection between male assembly 18 and female assembly 19.

Figure 20:
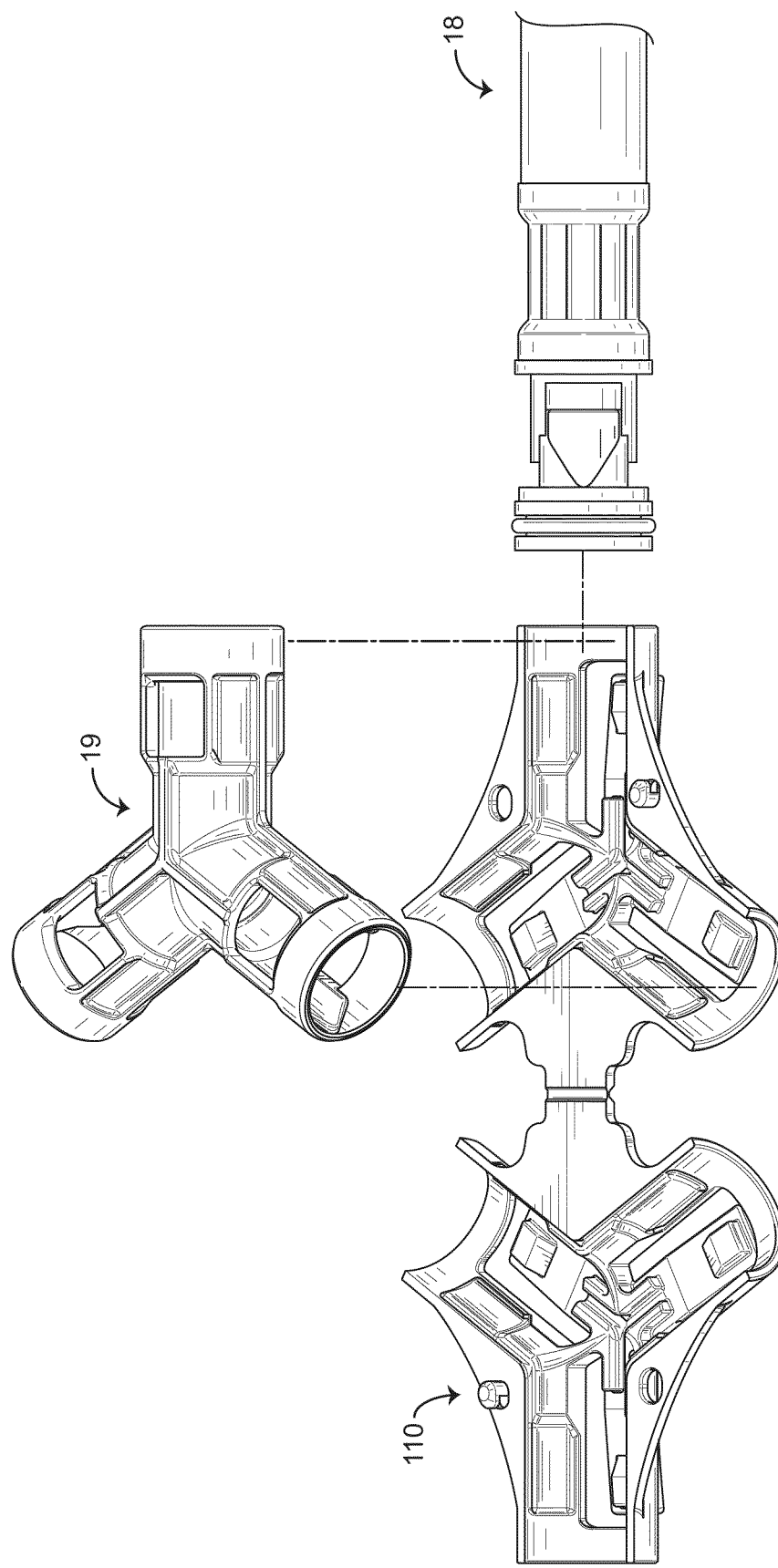
FIGS. 20-21 are perspective views of the quick connect release assembly of FIG. 15 in partially assembled states, shown according to exemplary embodiments.
Figure 21:
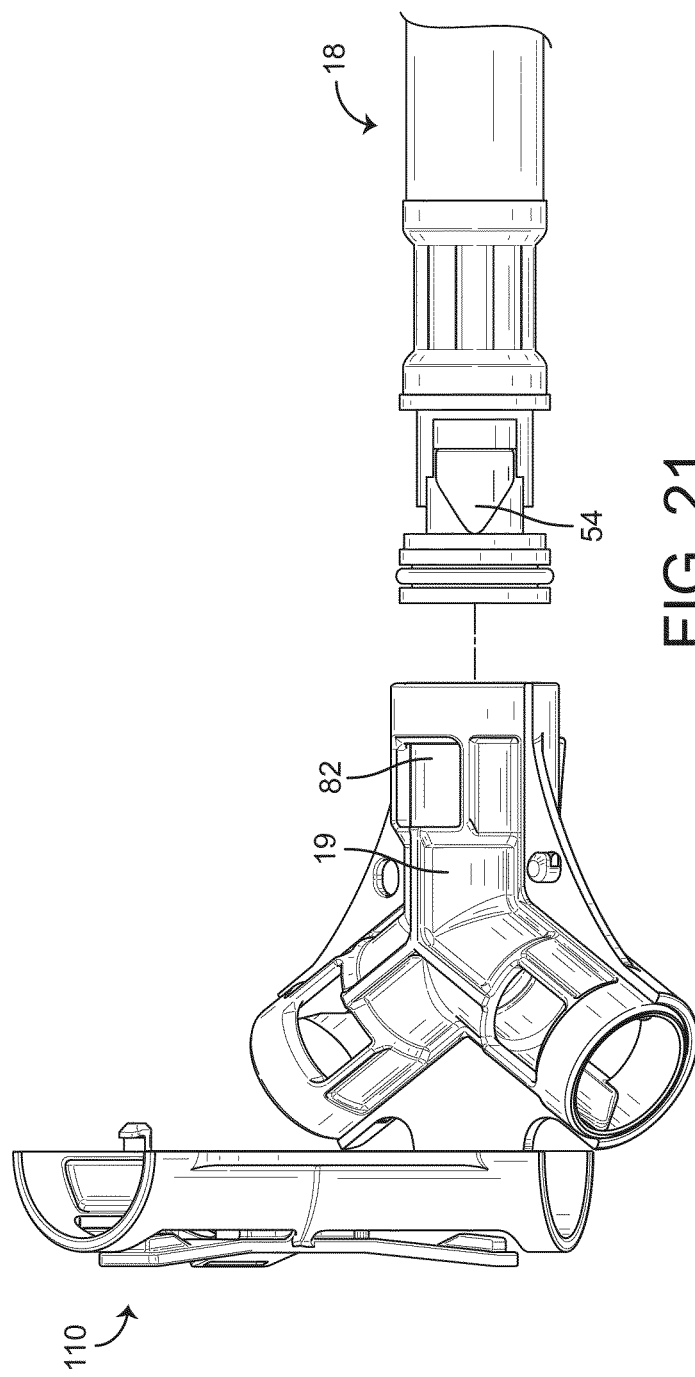

Referring now to FIGS. 20-21, perspective views of quick connect release assembly 100 in partially assembled states are shown, according to exemplary embodiments. Referring specifically to FIG. 20, quick connect release adaptor 110 is shown in an open configuration, with female assembly 19 aligned vertically above adaptor 110. Specifically, female assembly 19 is aligned such that the axes of bores 76 of female assembly 19 are aligned parallel with the axes of bores 120 of adaptor 110. Male assembly 18 is depicted as axially aligned with one of the three bores 120 of adaptor 110. Turning now to FIG. 21, female assembly 19 is lowered vertically into adaptor 110 such that the bores 76 of female assembly 19 are substantially concentric to the bores 120 of adaptor 110. Once adaptor 110 has been maneuvered to a closed configuration, male assembly 18 may be coupled to female assembly 19 as described in the sections above, specifically resulting in lugs 54 of male assembly 18 partially extending through the apertures 82 of female assembly 19. In another embodiment, male assembly 18 may first be assembled into female assembly 19 to form quick connect assembly 10. Quick connect assembly 10 may then be assembled with quick connect release adaptor 110 to form quick connect release assembly 100.

Figure 22:
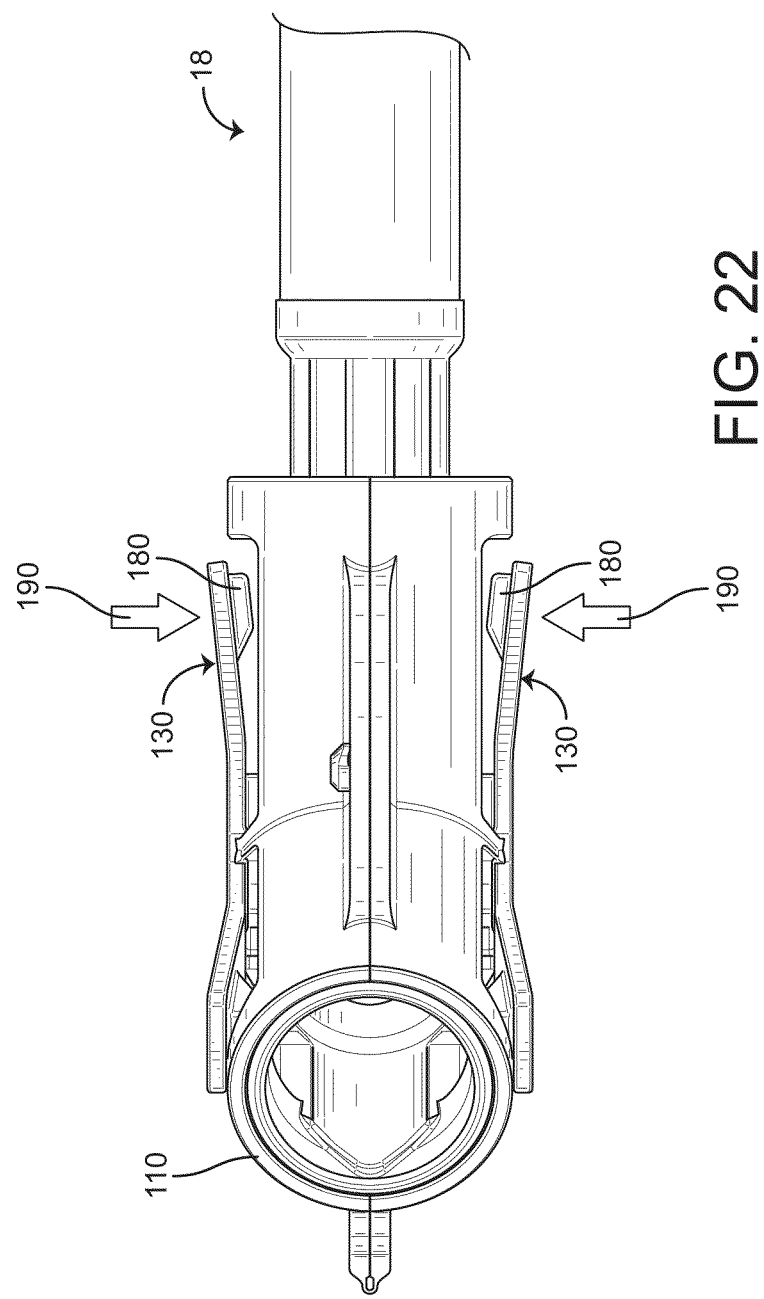

Referring now to FIGS. 22-23, elevation views of quick connect release assembly 100 in partially disassembled states are shown, according to exemplary embodiments. In order to disassemble quick connect release assembly 100, the user may first stop the fluid flow to the quick connect disconnect assembly 100, and relieve the fluid pressure within assembly 100. As shown in FIG. 23, as a user squeezes release tabs 130 (e.g., applies compressive force 190), the tabs pass through apertures 135 and force is transferred from release tab protrusions 180 to lugs 54. As compressive force 190 causes the lugs 54 to move together (e.g., toward one another), the interface of the undercut 60 and the lip 84 causes at least some of the force to be transferred into a positive axial force. When the broad end 58 of the lug 54 has moved over the lip 84, the clip 40 and/or the wings 48 may deflect such that the lugs 54 may move radially within the bore 76, which may be surrounded by bore 120 of release adaptor 110. Continuing the disconnect process and referring now to FIG. 23, when the components of the clip 40 are within the bore 76, the clip 40 may be moved axially toward the end 72 of the receiver 70 and out of the receiver 70. For example, the male assembly 18 may be withdrawn from quick connect release assembly 100 by pulling on the hose 12.

The construction and arrangement of the elements of the quick connect assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A quick connect and disconnect adaptor for a fluid coupling system, comprising:
    a first half having:
        a center point;
        a sidewall at least partially defining a plurality of bores, wherein each of the bores contains an aperture, and each of the bores terminates at the center point;
        a plurality of release tabs, wherein each aperture corresponds to a release tab of the plurality of release tabs, wherein each of the release tabs is configured to resiliently deflect about the center point through a respective aperture, and each of the release tabs terminates at the center point; and
    a second half, wherein the second half is at least partially symmetric to the first half;
    wherein the release tabs are further configured to transfer a compressive force to a fluid coupling fitting to move the fluid coupling fitting in an axial direction relative to the first half and the second half to remove the fluid coupling fitting from the adaptor.

2. The adaptor of claim 1, further comprising a hinge located between the first half and the second half, wherein the hinge connects the first half to the second half, and wherein the hinge permits the adaptor to travel between an open configuration and a closed configuration.

3. The adaptor of claim 2, wherein the sidewall further defines a plurality of flanges, and wherein the flanges contain retention features to retain the adaptor in a closed configuration.

4. The adaptor of claim 3, wherein the second half is rotationally symmetric to the first half.

5. The adaptor of claim 4, wherein the retention features comprise at least one peg and at least one hole.

6. The adaptor of claim 2, wherein the first half, the second half, and the hinge are fabricated as a unitary part.

7. A quick connect and disconnect adaptor for a fluid coupling system, comprising:
    a first half comprising:
        a sidewall at least partially defining a plurality of bores, wherein each of the plurality of bores includes an aperture disposed in the sidewall;
        a plurality of release tabs, wherein each aperture corresponds to a release tab of the plurality of release tabs, and wherein each of the plurality of release tabs is configured to resiliently deflect about a common point through a respective aperture by a force applied to each release tab so as to move a fluid coupling fitting in an axial direction to remove the fluid coupling fitting from the adaptor; and
    a second half that is at least partially symmetric to the first half.

8. The adaptor of claim 7, further comprising a hinge located between the first half and the second half, wherein the hinge pivotally couples the first half to the second half, and wherein the hinge permits the adaptor to travel between an open configuration and a closed configuration.

9. The adaptor of claim 8, wherein the sidewall further defines a plurality of flanges, and wherein the plurality of flanges include retention features to retain the adaptor in a closed configuration.

10. The adaptor of claim 9, wherein the second half is rotationally symmetric to the first half.

11. The adaptor of claim 10, wherein the retention features comprise at least one peg and at least one hole.

12. The adaptor of claim 8, wherein the first half, the second half, and the hinge are fabricated as a unitary part.

13. The adaptor of claim 7, wherein each of the plurality of release tabs comprises a tab protrusion configured to transfer the force to a lug of the fluid coupling fitting.

14. The adaptor of claim 7, wherein each of the plurality of release tabs is joined at the common point on the first half.

15. The adaptor of claim 14, wherein the common point is configured to serve as a fulcrum for each of the plurality of release tabs as they deflect relative to the apertures.

16. A quick connect and disconnect adaptor for a fluid coupling system, comprising:
    a first half comprising:
        a sidewall at least partially defining a plurality of bores, wherein each of the plurality of bores includes an aperture;
        a plurality of release tabs, wherein each aperture corresponds to a release tab of the plurality of release tabs, and wherein each of the plurality of release tabs is configured to resiliently deflect in a radial direction about a common point through a respective aperture by a force applied to each release tab so as to remove a fluid coupling fitting in an axial direction from each of the plurality of bores; and
        a second half pivotally coupled to the first half, wherein the second half is at least partially symmetric to the first half.

17. The adaptor of claim 16, further comprising a hinge located between the first half and the second half, wherein the hinge pivotally couples the first half to the second half, and wherein the hinge permits the adaptor to travel between an open configuration and a closed configuration.

18. The adaptor of claim 16, wherein each of the plurality of release tabs comprises a tab protrusion configured to transfer the force to a lug of the fluid coupling fitting.

19. The adaptor of claim 16, wherein each of the plurality of release tabs is joined at the common point on the first half.

20. The adaptor of claim 19, wherein the common point is configured to serve as a fulcrum for each of the plurality of release tabs as they deflect relative to the apertures.

* * * * *